US009049534B2

(12) United States Patent
Eichfeld et al.

(10) Patent No.: US 9,049,534 B2
(45) Date of Patent: *Jun. 2, 2015

(54) DIRECTIONALLY RADIATING SOUND IN A VEHICLE

(75) Inventors: Jahn Dmitri Eichfeld, Worcester, MA (US); Klaus Hartung, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 336 days.

This patent is subject to a terminal disclaimer.

(21) Appl. No.: 13/590,417

(22) Filed: Aug. 21, 2012

(65) Prior Publication Data

US 2012/0321099 A1 Dec. 20, 2012

Related U.S. Application Data

(63) Continuation of application No. 11/744,579, filed on May 4, 2007, now Pat. No. 8,325,936.

(51) Int. Cl.
*H04B 1/00* (2006.01)
*H04R 1/02* (2006.01)
(Continued)

(52) U.S. Cl.
CPC ............. *H04S 7/302* (2013.01); *H04R 2499/13* (2013.01); *H04S 3/002* (2013.01); *H04S 2400/11* (2013.01); *H04S 2400/13* (2013.01); *H04S 2420/03* (2013.01)

(58) Field of Classification Search
CPC ........... H04R 2430/20; H04R 2430/25; H04R 2203/12; H04R 1/323; H04R 1/403; H04R 7/302; H04R 2499/13; H04S 7/302; H04S 2400/11
USPC .............................. 381/86, 89, 302, 304, 307
See application file for complete search history.

(56) References Cited

U.S. PATENT DOCUMENTS 7,508,952 B2 3/2009 Hofmann et al.
7,688,992 B2 3/2010 Aylward et al.
(Continued)

FOREIGN PATENT DOCUMENTS

EP 1746862 A1 1/2007
JP 53045133 U 4/1978
(Continued)

OTHER PUBLICATIONS

CN Office Action dated Sep. 17, 2012 for CN Appln. No. 200880018796.6.
(Continued)

*Primary Examiner* — Vivian Chin
*Assistant Examiner* — Douglas Suthers

(57) ABSTRACT

An audio system for a vehicle includes a directional loudspeaker that is mounted to a vehicle seat. The directional loudspeaker radiates a first channel audio signal so that the direction toward an intended location of a first ear position of an occupant of the vehicle seat is a high radiation direction and radiates a second channel audio signal so that the direction toward an intended location of a second ear position of the occupant of the vehicle seat is a high radiation direction. A forward mounted loudspeaker radiates at least one of the first channel audio signal and the second channel audio signal. Signal processing circuitry modifies (e.g., delays) the first channel audio signal to at least one of the directional loudspeaker and the forward mounted loudspeaker to cause one of those speakers to dominate spatial perception.

12 Claims, 13 Drawing Sheets

(51) Int. Cl.

| | |
|---|---|
| ***H04R 5/02*** | (2006.01) |
| ***H04S 7/00*** | (2006.01) |
| *H04S 3/00* | (2006.01) |

(56) References Cited

U.S. PATENT DOCUMENTS

| | | | |
|---|---|---|---|
| 8,045,743 B2 | 10/2011 | Aylward et al. | |
| 8,175,317 B2 | 5/2012 | Nakano | |
| 8,199,940 B2 | 6/2012 | Yokota | |
| 2002/0150254 A1 | 10/2002 | Wilcock et al. | |
| 2007/0183617 A1 | 8/2007 | Yokota et al. | |
| 2008/0037794 A1 * | 2/2008 | Sugawara et al. | 381/1 |

FOREIGN PATENT DOCUMENTS

| | | | |
|---|---|---|---|
| JP | 62178683 | U | 11/1987 |
| JP | H05-061487 | | 3/1993 |
| JP | H05-122799 | | 5/1993 |
| JP | H05-344584 | A | 12/1993 |
| JP | H09-171387 | A | 6/1997 |
| JP | H09-247784 | A | 9/1997 |
| JP | 2003111200 | A | 4/2003 |
| JP | 2003299168 | A | 10/2003 |
| JP | 2006508573 | A | 3/2006 |
| JP | 2006345480 | A | 12/2006 |
| JP | 2007124129 | A | 5/2007 |
| JP | 2007251895 | A | 9/2007 |
| JP | 2008270857 | A | 11/2008 |
| WO | 02098171 | A1 | 12/2002 |

OTHER PUBLICATIONS

CN Office Action dated Jan. 9, 2013 for CN Appln. No. 200880018796.6.

Office Action dated Mar. 28, 2011, for U.S. Appl. No. 11/780,466.

Response to Final Office Action dated Apr. 9, 2012, for U.S. Appl. No. 11/780,463.

Response to Office Action dated Mar. 28, 2011, for U.S. Appl. No. 11/780,466.

Response to Final Office Action dated Oct. 26, 2011, for U.S. Appl. No. 11/780,466.

Office Action dated Jul. 5, 2012, for U.S. Appl. No. 11/780,461.

Response to Office Action dated Jul. 5, 2012, for U.S. Appl. No. 11/780,461.

Office Action dated Jun. 26, 2012, for U.S. Appl. No. 11/780,464.

Response to Office Action dated Jun. 26, 2012, for U.S. Appl. No. 11/780,464.

JP Official Inquiry dated Dec. 4, 2012 for JP Application No. 2010-506390, JP Appeal No. 2012-14502.

Office Action dated Sep. 26, 2012, for U.S. Appl. No. 11/780,468.

Response to Office Action dated Sep. 26, 2012, for U.S. Appl. No. 11/780,468.

* cited by examiner

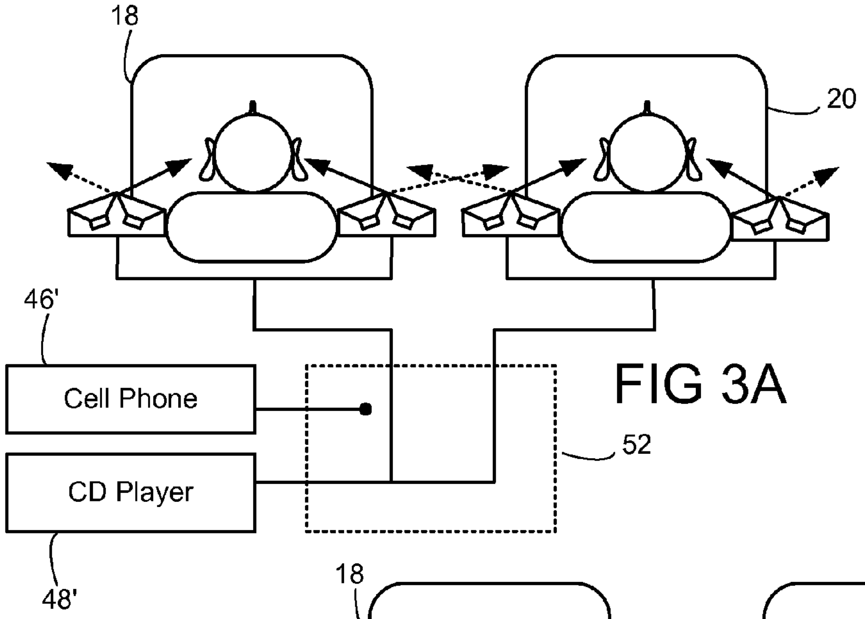
FIG 3A
FIG 3B
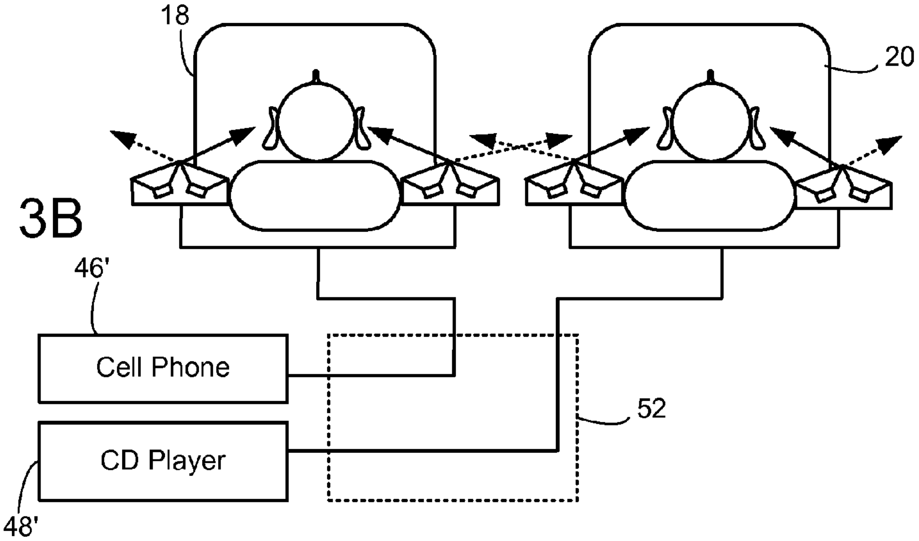
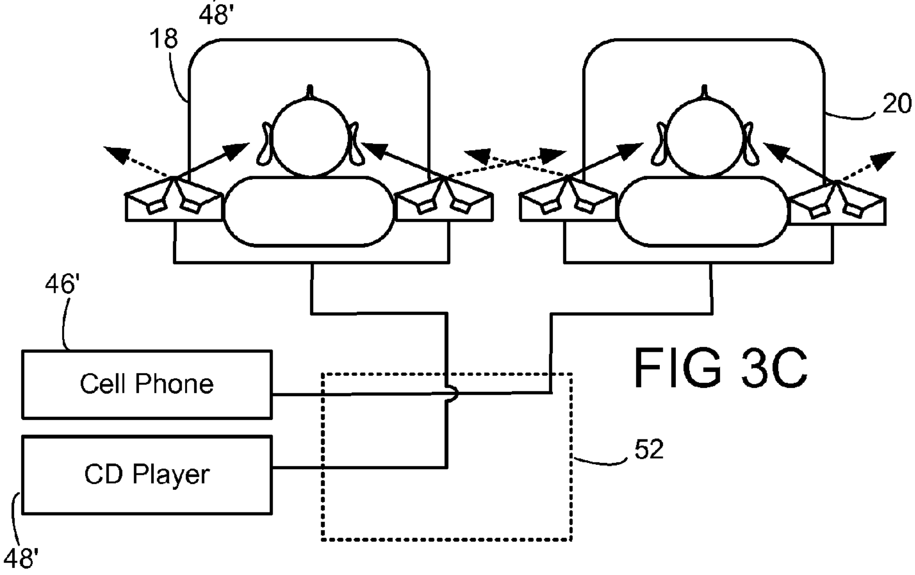
FIG 3C

DIRECTIONALLY RADIATING SOUND IN A VEHICLE

REFERENCE TO RELATED APPLICATIONS

This application is a continuation of, and claims priority of, U.S. patent application Ser. No. 11/744,579, filed May 4, 2007 by Eichfeld, et. al. incorporated by reference herein in its entirety

BACKGROUND

This specification describes an audio system for a vehicle that includes directional loudspeakers. Directional loudspeakers are described generally in U.S. Pat. Nos. 5,870,484 and 5,809,153. Directional loudspeakers in vehicle are discussed in U.S. patent application Ser. No. 11/282,871.

SUMMARY

In one aspect of the invention In one aspect, an apparatus includes a first directional loudspeaker for directionally radiating sound toward a first seating position in a vehicle at a first volume, a second directional loudspeaker for directionally radiating sound toward a second seating position in the vehicle at a second volume; and at least one of volume control circuitry, for controlling the first volume independently of the second volume; dynamic volume control circuitry, for dynamically controlling the first volume independently of the second volume; and equalization circuitry, for equalizing the sound radiated toward the first seating position independently of the sound radiated toward the second seating position.

The apparatus may further include a second volume control circuitry, for controlling the first volume independently of the second volume; dynamic volume control circuitry, for dynamically controlling the first volume independently of the second volume; and equalization circuitry, for equalizing the sound radiated toward the first seating position independently of the sound radiated toward the second seating position. The apparatus may further include a third volume control circuitry, for controlling the first volume independently of the second volume; dynamic volume control circuitry, for dynamically controlling the first volume independently of the second volume; and equalization circuitry, for equalizing the sound radiated toward the first seating position independently of the sound radiated toward the second seating position. The apparatus may further include at least one of volume control circuitry, for controlling the second volume independently of the first volume; dynamic volume control circuitry, for dynamically controlling the second volume independently of the first volume; and equalization circuitry, for equalizing the sound radiated toward the second seating position independently of the sound radiated toward the first seating position. The apparatus may further include a first volume control circuitry, for controlling the second volume independently of the first volume; dynamic volume control circuitry, for dynamically controlling the second volume independently of the first volume; and equalization circuitry, for equalizing the sound radiated toward the second seating position independently of the sound radiated toward the first seating position. The apparatus may further include a third volume control circuitry, for controlling the second volume independently of the first volume; dynamic volume control circuitry, for dynamically controlling the second volume independently of the first volume; and equalization circuitry, for equalizing the sound radiated toward the second seating position independently of the sound radiated toward the first seating position.

The apparatus may further include first spatial cues circuitry for inserting spatial cues in audio signals transmitted to the first directional loudspeaker; and second spatial cues circuitry, independent of the first spatial cues circuitry, for inserting spatial cues in audio signals transmitted to the second directional loudspeaker. The first directional loudspeaker and the second directional loudspeaker may be enclosed by the same enclosure. The first directional loudspeaker and the second directional loudspeaker may be directional arrays and the first directional loudspeaker and the second directional loudspeaker may share a common acoustic driver. The first directional loudspeaker may include a first acoustic driver and the common acoustic driver and may include circuitry that causes the common acoustic driver to radiate sound waves that destructively combine with sound waves radiated by the first acoustic driver. The second directional loudspeaker may include a second acoustic driver and further includes circuitry that causes the common acoustic driver to radiate sound waves that destructively combine with sound waves radiated by the first acoustic driver and the second acoustic driver. The apparatus may further include circuitry that causes the second acoustic driver to radiate sound waves that destructively combine with sound waves radiated by the first acoustic driver. The first directional loudspeaker may include a first acoustic driver and a second acoustic driver, and may include circuitry that causes the second acoustic driver to radiate sound waves that destructively combine with sound waves radiated by the first acoustic driver.

In another aspect, an apparatus includes a first directional loudspeaker for directionally radiating sound toward a first seating position in a vehicle; a second directional loudspeaker for directionally radiating sound toward a second seating position in the vehicle; signal source selection circuitry, for selecting audio signals from any one of a plurality of audio signal sources for transmission to the first directional loudspeaker and for selectively selecting audio signals from another of the plurality of audio signal sources for transmission to the second directional loudspeaker.

The signal source selection circuitry may include circuitry for switching the selection of the one of the plurality of audio signal sources for transmission to the second directional loudspeaker. The plurality of signal sources may include at least one of a cellular telephone and a navigational system. The signal source selection circuitry may select audio signals from more than one of the plurality of audio signal sources for transmission to the first seating position and may include volume control circuitry for causing the audio signals to be radiated directionally toward the first seating position at different volume. The first directional speaker may directionally radiate sound toward the position typically occupied by the left ear of an occupant of the first seating position and may include a third directional speaker for directionally radiating sound toward the position typically occupied by the right ear of an occupant of the first seating position. The first directional speaker may include a first acoustic driver for radiating sound waves that destructively interfere with sound waves from a second acoustic driver so that the direction toward the position typically occupied by the right ear of an occupant of the seating position is a low radiation direction, and the second acoustic driver may be for radiating sound waves that destructively interfere with sound waves from the first acoustic driver so that the direction toward the position typically occupied by the left ear of an occupant of the seating position is a low radiation direction. The first directional speaker may include three acoustic drivers, and one of the acoustic drivers may radiate sound waves the destructively interfere with sound waves radiated by a second of the acoustic drivers so that the direction toward the position typically occupied by the left ear of an occupant of the seating position is a low radiation direction and the one of the acoustic drivers may radiate sound waves that destructively interferes with sound waves radiated by a third of the acoustic drivers so that the direction toward the position typically occupied by the right ear of an occupant of the seating position is a low radiation direction. The e second acoustic driver may radiate sound waves that destructively interfere with sound waves radiated by the third acoustic driver. The signal source selection circuitry may be for selecting audio signals from more than one of the plurality of audio signal sources for transmission to the first directional loudspeaker.

In another aspect, a method includes directionally radiating sound toward a first seating position in a vehicle at a first volume, directionally radiating sound toward a second seating position in the vehicle at a second volume; and at least one of controlling the first volume independently of the second volume; dynamically controlling the first volume independently of the second volume; and equalizing the sound radiated toward the first seating position independently of the sound radiated toward the second seating position.

The method may further include a second of controlling the first volume independently of the second volume; dynamically controlling the first volume independently of the second volume; and equalizing the sound radiated toward the first seating position independently of the sound radiated toward the second seating position. The method may further include a third of controlling the first volume independently of the second volume; dynamically controlling the first volume independently of the second volume; and equalizing the sound radiated toward the first seating position independently of the sound radiated toward the second seating position.

The method may further include at least one of controlling the second volume independently of the first volume; dynamically controlling the second volume independently of the first volume; and equalizing the sound radiated toward the second seating position independently of the sound radiated toward the first seating position. The method may further include a second of controlling the second volume independently of the first volume; dynamically controlling the second volume independently of the first volume; and equalizing the sound radiated toward the second seating position independently of the sound radiated toward the first seating position. The method may further include a third of controlling the second volume independently of the first volume; dynamically controlling the second volume independently of the first volume; and equalizing the sound radiated toward the second seating position independently of the sound radiated toward the first seating position.

The method may further include a first inserting of first spatial cues in audio signals transmitted to the first directional loudspeaker; and a second inserting of second spatial cues, independently of the first inserting to the second directional loudspeaker.

The first directional loudspeaker and the second directional loudspeaker may be enclosed by the same enclosure.

The first radiating may be done by a first directional array and the second radiating may be done by a second directional array, and the first directional loudspeaker and the second directional loudspeaker share a common acoustic driver. The first directional loudspeaker may include a first acoustic driver and the common acoustic driver and the method may further include radiating, by the common acoustic driver sound waves that destructively combine with sound waves radiated by the first acoustic driver. The method may further include radiating sound waves that destructively combine with sound waves radiated by the first acoustic driver and the second acoustic driver. The method may further include radiating, by the second acoustic driver sound waves that destructively combine with sound waves radiated by the first acoustic driver. The method may further include radiating, by the second acoustic driver sound waves that destructively combine with sound waves radiated by the first acoustic driver.

In another aspect, a method includes directionally radiating at a first volume sound corresponding to signals from a first of a plurality of sound sources toward a first seating position in a vehicle; and directionally radiating sound corresponding to signals from a second of the plurality of sound sources toward a second seating position in the vehicle.

The method may include switching from directionally radiating toward the second seating position sound corresponding to second audio signals to directionally radiating toward the second position sound corresponding to first audio signals. The plurality of signal sources may include at least one of a cellular telephone and a navigational system. The method may further include directionally radiating, at a second volume independent of the first volume, sound waves corresponding to audio signals from the second audio signal source toward the first seating position. The directionally radiating sound toward the first seating position may include directionally radiating sound toward a position typically occupied by the left ear of an occupant of the first seating position and may further include directionally radiating, by a third directional loudspeaker, sound toward a position typically occupied by the right ear of an occupant of the first seating position. The directionally radiating sound toward the may include radiating sound waves from one acoustic driver that destructively interfere with sound waves from a second acoustic driver. The signal source selection circuitry may be for selecting audio signals from more than one of the plurality of audio signal sources for transmission to the first directional loudspeaker.

In another aspect, a method includes inserting spatial cues into an audio signal based on the content of the message. The spatial cues may be consistent with a moving sound source. The message may be an instruction to turn the vehicle in a direction and the spatial cues may be consistent with a sound source moving the direction. The message may contain information about an event at a location in a direction relative to a seating position and wherein the spatial cues may be consistent with a sound source in the direction. The spatial cues may be indicative of the distance from a sound source to a driver. The method may include directionally radiating sound corresponding to the audio signal.

In another aspect, an audio system for a vehicle includes a directional loudspeaker mounted to a vehicle seat, behind the intended location of the head of an occupant of the vehicle seat and substantially equidistant from the intended position of the two ears of an occupant of the vehicle seat. The directional loudspeaker may be for radiating a first channel signal directionally so that the direction toward the intended location of a first ear position of an occupant of the vehicle seat is a high radiation direction and radiating a second channel signal directionally so that the direction toward the intended location of a second ear position of an occupant of the vehicle seat is a high radiation direction. A forward mounted loudspeaker may be mounted forward of the directional loudspeaker for radiating at least one of the first channel and the second channel. The audio system may further include signal processing circuitry for modifying the audio signal to at least one of the directional loudspeaker and the forward mounted loudspeaker to modify spatial perception. The signal processing circuitry may include circuitry for delaying the audio signal to one of the directional loudspeaker and the forward mounted loudspeaker. The signal processing circuitry may include circuitry that modifies audio signals so that the directional loudspeaker dominates spatial perception in one frequency band and so the forward mounted loudspeaker dominates spatial perception in another frequency band. The signal processing circuitry may include circuitry that modifies audio signals so that the forward mounted loudspeaker dominates spatial perception. The signal processing circuitry may include circuitry that modifies audio signals so that the directional loudspeaker dominates spatial perception. The signal processing circuitry may include circuitry that modifies audio signals so that the directional loudspeaker dominates left/right spatial perception and the front speaker dominates front/rear spatial perception. The signal processing circuitry may include circuitry for time delaying an audio signal to one of the directional loudspeaker and the forward mounted loudspeaker. The signal processing circuitry may include circuitry for attenuating the audio signal to one of the directional loudspeaker and the forward mounted loudspeaker. The forward mounted loudspeaker may be for radiating a combination of the first channel and the second channel. In another aspect, an audio system for a vehicle includes a directional loudspeaker mounted and a vehicle seat, behind the intended location of the head position of an occupant of the vehicle seat and substantially equidistant from the position of the two ears of an occupant of the vehicle seat. The directional loudspeaker may be for radiating a left channel signal and a right channel signal with a first directional pattern. The directional loudspeaker may further be for radiating a surround channel with a second directional pattern. The audio system may further include audio processing circuitry and additional loudspeakers to cause the acoustic image of the source of left channel radiation and right channel radiation to appear forward of the acoustic image of left surround channel radiation and right surround channel radiation.

In another aspect, a method for operating a vehicle audio system includes directionally radiating, from a loudspeaker mounted to a vehicle seat, behind the intended location of the head of an occupant of the vehicle seat and substantially equidistant from the intended position of the two ears of an occupant of the vehicle seat, a first channel so that the direction toward the intended location of a first ear position of an occupant of the vehicle seat is a high radiation direction; directionally radiating from the loudspeaker, a second channel signal so that the direction toward the intended location of a second ear position of an occupant of the vehicle seat is a high radiation direction; non-directionally radiating, from a loudspeaker mounted forward of the directional loudspeaker, at least one of the first channel and the second channel; and processing the audio signal to at least one of the directional loudspeaker and the forward mounted loudspeaker to modify spatial perception. The processing may include delaying the audio signal to one of the directional loudspeaker and the forward mounted loudspeaker. The signal processing may result in the directional loudspeaker dominating spatial perception in one frequency band and in the forward mounted loudspeaker dominating spatial perception in another frequency band. The signal processing may cause the forward mounted loudspeaker to dominate spatial perception. The signal processing may cause the directional loudspeaker to dominate spatial perception. The signal processing may cause the directional loudspeaker to dominate left/right spatial perception and the front speaker to dominate front/rear spatial perception. The signal processing may include time delaying an audio signal to one of the directional loudspeaker and the forward mounted loudspeaker. The signal processing may include attenuating the audio signal to one of the directional loudspeaker and the forward mounted loudspeaker. The audio system may further include radiating a combination of the first channel and the second channel from a center channel forward mounted speaker.

Other features, objects, and advantages will become apparent from the following detailed description, when read in connection with the following drawing, in which:

BRIEF DESCRIPTION OF THE SEVERAL VIEWS OF THE DRAWING

FIGS. 2, 3A-3C, and 4, are block diagrams;

DETAILED DESCRIPTION

Figure 1:
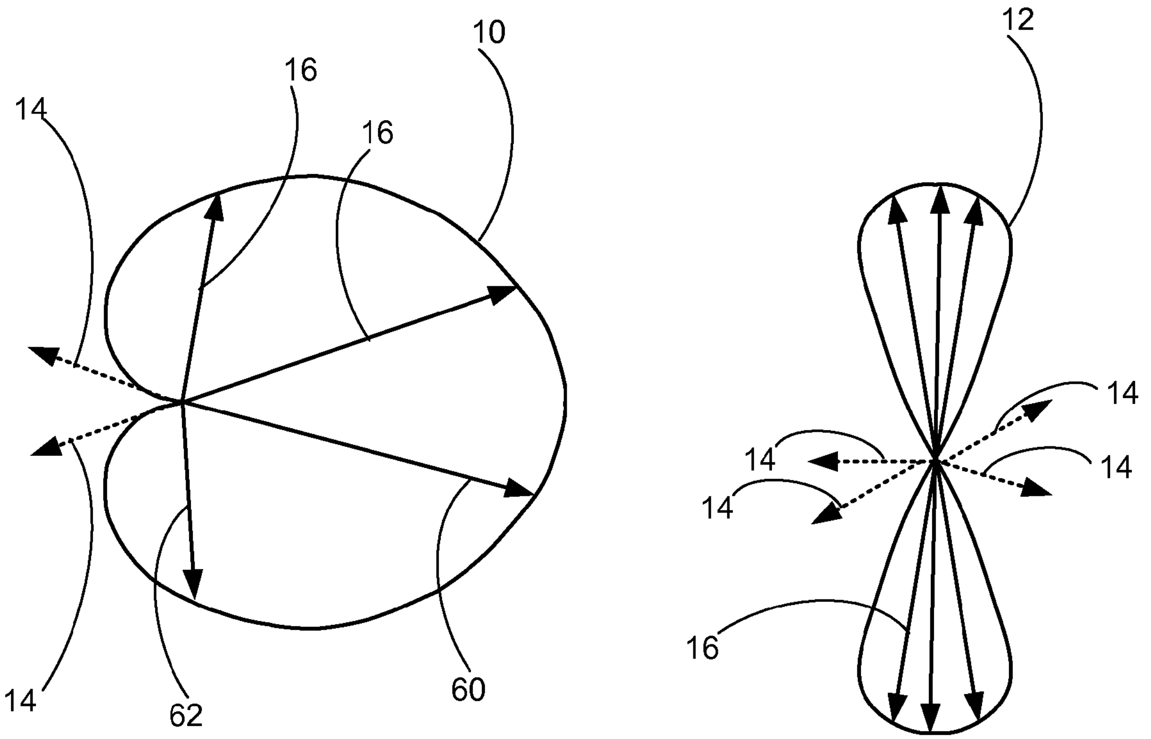
FIG. 1 shows polar plots of radiation patterns.

Though the elements of several views of the drawing may be shown and described as discrete elements in a block diagram and may be referred to as "circuitry", unless otherwise indicated, the elements may be implemented as one of, or a combination of, analog circuitry, digital circuitry, or one or more microprocessors executing software instructions. The software instructions may include digital signal processing (DSP) instructions. Unless otherwise indicated, signal lines may be implemented as discrete analog or digital signal lines, as a single discrete digital signal line with appropriate signal processing to process separate streams of audio signals, or as elements of a wireless communication system. Some of the processing operations may be expressed in terms of the calculation and application of coefficients. The equivalent of calculating and applying coefficients can be performed by other analog or digital signal processing techniques and are included within the scope of this patent application. Unless otherwise indicated, audio signals may be encoded in either digital or analog form; conventional digital-to-analog or analog-to-digital converters may not be shown in the figures. For simplicity of wording "radiating acoustic energy corresponding the audio signals in channel x" will be referred to as "radiating channel x." "Acoustic energy (or sound) corresponding to the audio signal from source y" will be referred to as "acoustic energy (or sound) from source y."

Directional loudspeakers are loudspeakers that have a radiation pattern in which more acoustic energy is radiated in some directions than in others. Directional arrays are directional loudspeakers that have multiple acoustic energy sources. In a directional array, over a range of frequencies in which the corresponding wavelengths are large relative to the spacing of the energy sources, the pressure waves radiated by the acoustic energy sources destructively interfere, so that the array radiates more or less energy in different directions depending on the degree of destructive interference that occurs. The directions in which relatively more acoustic energy is radiated, for example directions in which the sound pressure level is within 6 dB of (preferably between −6 dB and −4 dB, and ideally between −4 dB and −0 dB) the maximum sound pressure level (SPL) in any direction at points of equivalent distance from the directional loudspeaker will be referred to as "high radiation directions." The directions in which less acoustic energy is radiated, for example directions in which the SPL is a level at least −6 dB (preferably between −6 dB and −10 dB, and ideally at a level down by more than 10 dB, for example −20 dB) with respect to the maximum in any direction for points equidistant from the directional loudspeaker, will be referred to as "low radiation directions". In all of the figures, directional loudspeakers are shown as having two cone-type acoustic drivers. The directional loudspeakers may be some type of directional loudspeaker other than a multi-element loudspeaker. The acoustic drivers may be of a type other than cone types, for example dome types or flat panel types. Directional arrays have at least two acoustic energy sources, and may have more than two. Increasing the number of acoustic energy sources increases the control over the radiation pattern of the directional loudspeaker, for example by permitting control over the radiation pattern in more than one plane. The directional loudspeakers in the figures show the location of the loudspeaker, but do not necessarily show the number of, or the orientation of, the acoustic energy sources. The number of and the orientation of the acoustic energy sources and signal processing necessary to produce directional radiation patterns may be done employing the techniques described in the Background section.

Directional characteristics of loudspeakers are typically displayed as polar plots, such as the polar plots of FIG. 1. Polar plot 10 represents the radiation directional characteristics of a directional loudspeaker, in this case a so-called "cardioid" pattern. Polar plot 12 represents the radiation directional characteristics of a second type of directional loudspeaker, in this case a dipole pattern. Polar plots 10 and 12 indicate a directional radiation pattern. The low radiation directions indicated by dotted lines 14 may be, but are not necessarily, "null directions." Null directions are indicated by vectors originating at the centroid of the acoustic energy sources and connecting points at which the local radiation is at a local minimum relative to other points equally spaced from the acoustic energy source. High radiation directions are indicated by solid lines 16. In the polar plots, the length of the vectors in the high radiation directions represents the relative amount of acoustic energy radiated in that direction. For example, in the cardioid polar pattern, more acoustic energy is radiated in direction 60 than in direction 62.

The vehicle audio systems described herein include directional loudspeakers that radiate more acoustic energy in some directions than in others. In most circumstances it is desirable that the directions in which more acoustic energy is radiated are high radiation directions (as described above) and that the directions in which less acoustic energy is radiated are low radiation directions (as described above). However, in most situations, some improvement over conventional audio systems can be obtained even if the direction in which less acoustic energy is radiated is a high radiation direction. Situations which are particularly suited to the direction in which less acoustic energy is radiated being a high radiation direction will be noted in the specification.

Figure 2:
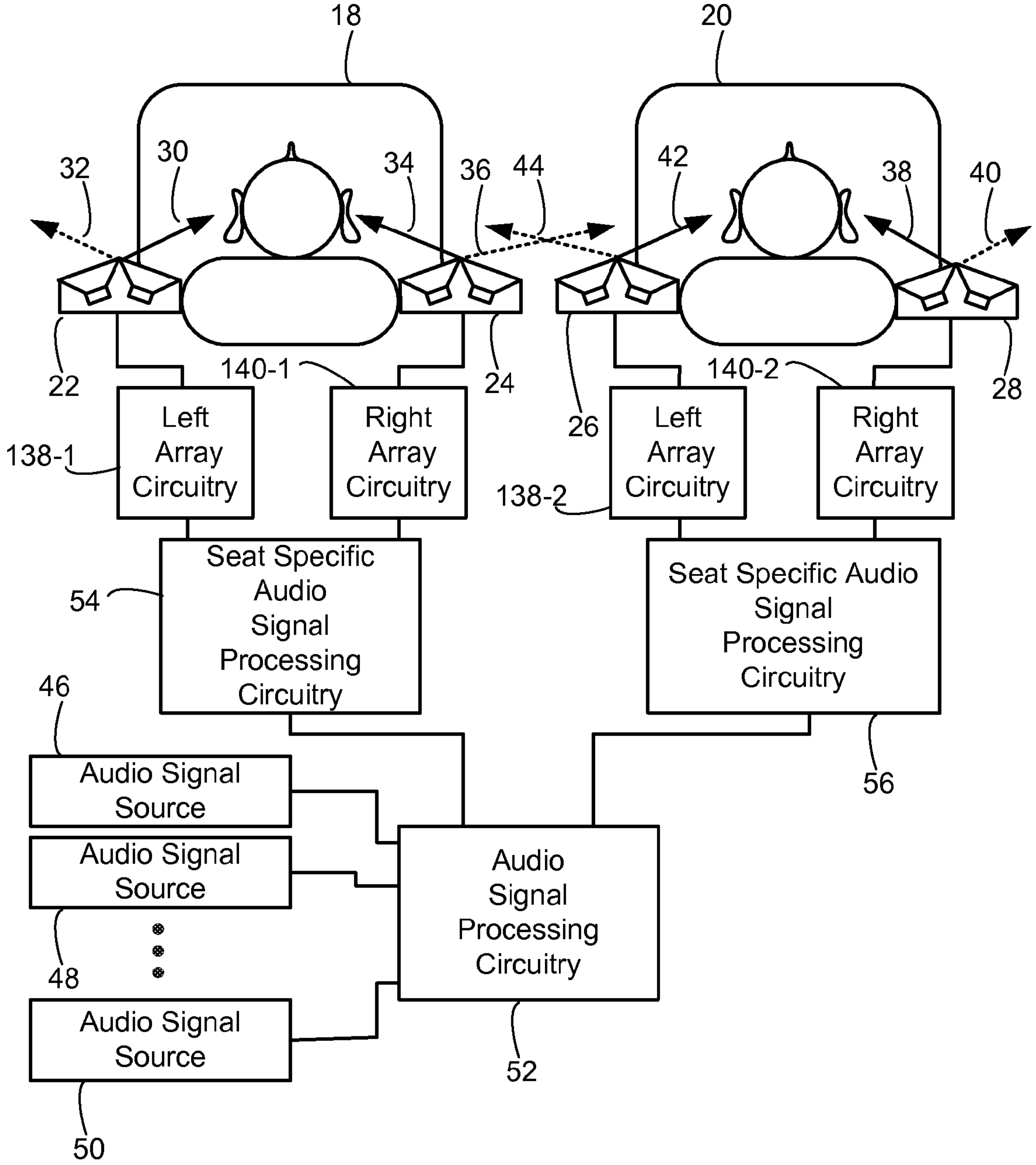

FIG. 2 shows a diagram of a vehicle passenger compartment with an audio system. The passenger compartment includes two seating positions, 18 and 20. Associated with seating position 18 are two directional loudspeakers 22 and 24 positioned on either side of the normal head position of the occupant of the seat, positioned, for example in the seat back, in the headrest, on the side of the headrest, in the headliner, or in some other similar location. Similarly positioned are two directional loudspeakers 26 and 28, associated with seating position 20. The radiation pattern of directional loudspeaker 22, located between an occupant of seating position 18 and the nearest side of the vehicle is arranged so that the direction 30 toward the left ear of an occupant of seating position 16 is a high radiation direction and, preferably, so that the direction 32 toward the side of the vehicle is a low radiation direction. The radiation pattern of directional loudspeaker 24, located to the right of seating position 18, is arranged so that the direction 34 toward the right ear of an occupant of seating position 18 is a high radiation direction and so that the direction 36 toward seating position 20 is a low radiation position. The radiation pattern of directional loudspeaker 28, positioned between seating position 20 and the nearest side of the vehicle is arranged so that the direction 38 toward the right ear of an occupant of seating position 20 is a high radiation direction and so that direction 40 toward the side of the vehicle is a low radiation direction. The radiation pattern of directional loudspeaker 26, positioned between seating positions 18 and 20, is arranged so that direction 42 toward the left ear of an occupant of seating position 20 is a high radiation direction and direction 44 toward seating position 18 is a low radiation direction. The audio system may include a plurality of signal sources 46-50 coupled to audio signal processing circuitry 52. Audio signal processing circuitry 52 is coupled to seat specific audio signal processing circuitry 54, which is coupled to directional loudspeakers 22 and 24 by array circuitry 138-1 and 140-1 respectively. Audio signal processing circuitry is also coupled to seat specific audio signal processing circuitry 56, which is coupled to directional loudspeakers 26 and 28 by array circuitry 138-2 and 140-2, respectively. The seat specific audio circuitry 54, 56 or the audio signal processing circuitry or both, may also include integration circuitry for integrating the directional loudspeakers with other speakers in the vehicle cabin. Integration circuitry will be shown in FIG. 11A-11C and described in the corresponding portion of the specification.

In operation audio signal processing circuitry 52 presents signals from the audio signal sources 46-50 to directional loudspeakers 22 and 24 and directional loudspeakers 26 and 28. The audio signal presented to directional loudspeakers 22 and 24 may be from the same audio signal source as the audio signal presented to loudspeakers 26 and 28 or may be from a different audio signal source. Seat specific audio signal processor 54 performs operations on the audio signal transmitted to directional loudspeakers 22 and 24 and seat specific audio signal processor 56 performs operations on the audio signal to directional loudspeakers 26 and 28. The audio signal to directional loudspeakers 22 and 24 may be monophonic, or may be a left channel and a right channel, respectively, of a stereophonic signal or may be a left channel and right channel or the left surround channel and right surround channel of a multichannel audio signal. Similarly, the audio signal to directional loudspeakers 26 and 28 may be monophonic, or may be a left channel and a right channel, respectively, of a stereophonic audio signal or may be a left channel and right channel or the left surround channel and right surround channel of a multichannel audio signal. Array circuitry 138-1, 140-1, 138-2, and 140-2 apply some combination of phase shift, polarity inversion, delay, attenuation and other signal processing in a manner described in U.S. Pat. No. 5,870,484 or U.S. Pat. No. 5,809,153 to cause directional loudspeakers 22, 24, 26, and 28 to have the desired radiation pattern.

The directional nature of the loudspeakers has several effects. One effect is that acoustic energy radiated from directional loudspeakers 22 and 24 has significantly higher amplitude (for example _dB) in seating area 18 than acoustic energy radiated from directional loudspeakers 26 and 28. Similarly, acoustic energy radiated from directional loudspeakers 26 and 28 has significantly higher amplitude (for example _dB) in seating area 20 than acoustic energy radiated from directional loudspeakers 22 and 24. A result of this effect is that acoustic energy radiated from directional loudspeakers 22 and 24 at a relatively low level is clearly audible in seating position 18, and acoustic energy radiated at a relatively low level from directional loudspeakers 26 and 28 is clearly audible in seating position 20. Another result of these effects is that sound can be radiated at a relatively high level toward one seating position but be radiated at a lower level toward the other seating position.

FIGS. 3A-3C illustrate one function of audio signal processing circuitry 52, namely routing audio signals from the audio signal sources 46-50 to directional loudspeakers associated with the seating positions 18 and 20. In the example of FIGS. 3A-3C, for simplicity only two audio signal sources, a cell phone 46' and a CD (compact disk) player 48' are shown. In FIG. 3A, the audio signal from the CD player 48' is transmitted to directional loudspeakers associated with both seating positions 18 and 20, so that occupants of both seating positions listen to program material from the CD player. In FIG. 3A, there is no audio signal from the cell phone 46'. In FIG. 3B, the audio signal from the cell phone 46' is transmitted to directional loudspeakers associated with seating position 18 only, and the audio signal from the CD player 48' is transmitted to directional loudspeakers associated with seating position 20 only. In FIG. 3C, the audio signal from the cell phone 46' is transmitted to directional loudspeakers associated with seating position 20 only, and the audio signal from the CD player 48' is transmitted to directional loudspeakers associated with seating position 18 only. A result is that sound from the cell phone is not distracting to the occupant listening to acoustic energy from the CD player; sound from the CD player is not distracting to the occupant listening to acoustic energy from the cell phone; and a significantly reduced level of sound from the CD player is picked up by a microphone in, near, or with directional characteristics preferring sound from, the seating position of the occupant conducting a cell phone conversation. In addition, the occupant conducting the cell phone conversation is less inclined to “shout over” the sound from the CD player, annoying other passengers in the vehicle. Sound from the cell phone radiated a relatively low level is audible to the occupant conducting the cell phone conversation. Sound from the CD player is significantly less audible by the occupant conducting the cell phone conversation than the sound from the CD player is audible to the other occupant. A significantly reduced level of sound from the CD player is picked up by a microphone in, near, or with directional characteristics preferring sound from, the seating position of the occupant conducting a cell phone conversation. The occupant of either seat may listen to the cell phone.

For simplicity, in FIGS. 2 and 3A-3C, some of the elements are shown as coupled by single lines. The single lines may represent a plurality of channels, for example a left and right channel of a stereophonic system or as a plurality of channels in a multichannel system. For simplicity, FIGS. 3A-3C show each seating position receiving audio signals from only one source, and FIGS. 3B-3C show the each audio signal source being transmitted to only one seating position. In other implementations, a single seating position may receive signals from more than one source, but the signal from one source may be significantly attenuated or amplified. For example, in FIG. 3B, audio signal from the CD player 48' may be transmitted to seating position 18, but significantly attenuated, allowing the occupant of seating position 18 to listen to music as well as to the cell phone. Also, for convenience, the seat specific audio processing circuitry 54 and 56 is not shown in these views.

In addition to routing audio signals from the audio signal sources to the directional loudspeakers, the audio signal processing circuitry 52 may perform other functions. For example, if there is an equalization pattern associated with one of the audio sources, the audio signal processing circuitry 52 may apply the equalization pattern to the audio signal from the associated audio signal source.

Figure 4:
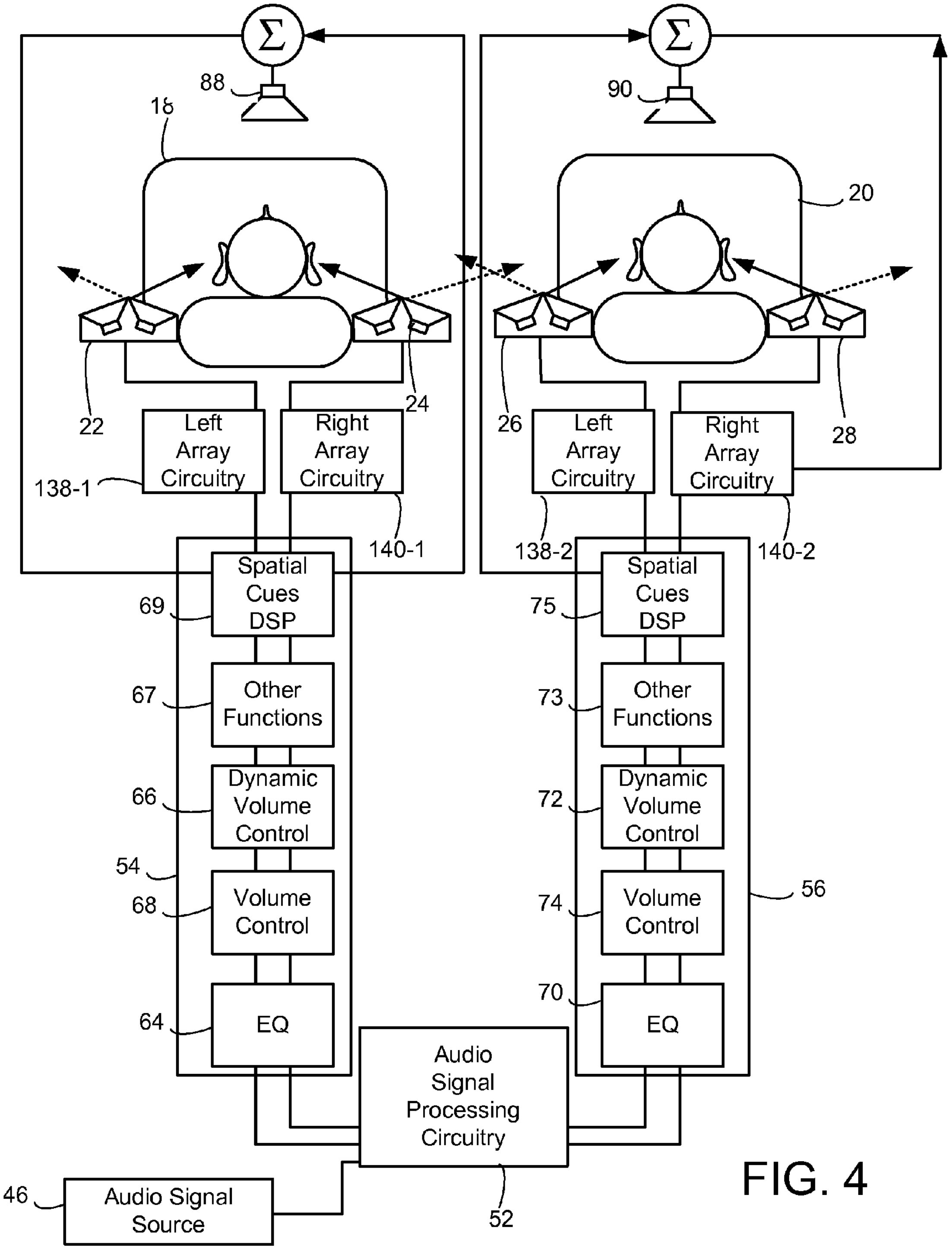

Referring to FIG. 4, there is a shown a diagram of the passenger compartment with the seat specific audio signal processing circuitry shown in more detail. For simplicity, it will be assumed that the occupants of both seating positions 18 and 20 are listening to the same audio signal source 46. Coupled to audio signal processing circuitry 52, as components of seat specific audio signal processing circuitry, are a seat specific equalizer 64, seat specific dynamic volume control circuitry 66, seat specific volume control circuitry 68, seat specific other functions circuitry 67, and seat specific spatial cues processor 69. Coupled to audio signal processing circuitry 52, as components of seat specific audio signal processing circuitry 56, are a seat specific equalizer 70, seat specific dynamic volume control circuitry 72, seat specific volume control 74, seat specific other functions circuitry 73, and seat specific spatial cues processor 75. In FIG. 4, the single signal lines of FIGS. 2 and 3A-3C, between the audio signal processing circuitry 52 and the elements of seat specific audio signal processing circuitry 54 and 56 are shown as two signal lines, representing a left channel and a right channel of a stereo system or two or more channels of a multichannel audio system. The interconnections of front speakers 88 and 90 will be discussed below.

In operation, the equalizer 64, the dynamic volume control circuitry 66, the volume control circuitry 68, the seat specific other functions circuitry 67 (which includes other signal processing functions for example, insertion of crosstalk cancellation), and the seat specific spatial cues processor 69 (which along with seat specific spatial cues processor 75 will be discussed later) of seat specific audio signal processing circuitry 54 process the audio signal from audio signal processing circuitry 52 separately from the equalizer 70, the dynamic volume control circuitry 72, and the volume control circuitry 74, the seat specific other functions circuitry 73, and the seat specific spatial cues circuitry 75 of seat specific audio signal processing circuitry 56. The operation of front speakers 88 and 90 is described below. If desired, the equalization patterns may be different. For example, if the occupant of one position is listening to a cell phone, the equalization pattern may be appropriate for voice. If the occupant of the other position is listening to music, the equalization pattern may be appropriate for music. Alternatively, the equalization pattern appropriate for voice or music may be applied by the audio signal processing circuitry 52, as described above. FIG. 4 also has array circuitry 138-1, 140-1, 138-2, and 140-2 of FIG. 2.

The seat specific dynamic volume controls can be responsive to an operating condition of the vehicle (such as the speed) or can be responsive to sound detecting devices, such as microphones, in the seating areas. A technique for dynamic control of volume is described in U.S. Pat. No. 4,944,018, Techniques for dynamic control of volume using sound detecting devices are described in U.S. Pat. No. 5,434,922. Additionally, there may be circuitry permitting the seat occupant some control over the dynamic volume control.

The arrangement of FIG. 4 permits the occupants of the two seating positions to listen to audio material at different volumes. The directional radiation pattern of the directional loudspeakers results in significantly more acoustic energy being radiated in the high radiation than in the low radiation directions. The acoustic energy at each of the seating positions therefore comes primarily from the directional loudspeakers associated with that seating position and not from the directional loudspeakers associated with other seating positions, even if the directional loudspeakers associated with other seating positions are being played at relatively high volumes. The seat specific dynamic volume control circuitry, when used with microphones near the seating positions, permits more precise dynamic control of the volume at each location. If the noise level is significantly higher at one seating position, for example seating position 18, than at the other seating position, for example seating position 20, the dynamic volume control associated with seating position 18 will raise the volume more than the dynamic volume control associated with seating position 20. The seat specific equalization permits better local control of the frequency response at the each of the listening positions. The measurements from which the equalization patterns are developed can be made at the individual seating positions. It is not necessary to take equalization patterns at several positions and combine them. The directional radiation pattern can be helpful in reducing the occurrence of frequency response anomalies resulting from early reflections, because a reduced amount of acoustic energy is radiated toward nearby reflective surfaces such as side windows. The seat specific other functions control circuitry can provide seat specific control of other functions typically associated with vehicle audio systems, for example tonal control. Left/right balance, typically referred to as simply "balance" is accomplished very differently in the system of FIG. 4 than in conventional audio systems as will be described below.

In order to most effectively control the volume, dynamic volume control, the equalization, and other functions at the two seats independently, it is desirable to have independent sound sources over the entire audible frequency range. It is difficult to control the bass frequencies using directional arrays because the wavelengths are long relative to the distance of the directional loudspeakers from the listener's ears. In one embodiment, the bass frequencies are radiated by a dipole type bass loudspeaker, such as described in U.S. patent application Ser. No. 11/224,886.

Left/right balance in conventional vehicle audio systems is typically done by changing the gain of a speaker or a set of speakers on one side of the vehicle. However conventional vehicle audio systems do a relatively poor job of controlling the lateral positioning of an acoustic image for a number of reasons, one of which is poor management of crosstalk, that is, radiation from the left speaker reaching the right ear and radiation from the right speaker reaching the left ear. Perceptually, lateral positioning (or stated more broadly angular displacement in the azimuthal plane) is dependent on two factors. One factor is the relative level of acoustic energy at the two ears, sometimes referred to as "interaural level difference" (ILD) or "interaural intensity difference" (IID). Another factor is time and phase difference (interaural time difference or "ITD" and interaural phase difference or "IPD") of acoustic energy at the two ears. ITD and IPD are mathematically related in a known way and can be transformed into each other, so that wherever the term "ITD" is used herein, the term "IPD" can also apply, through appropriate transformation. The ITD, IPD, ILD, and IID spatial cues result from the interaction, with the head and ears, of sound waves that are radiated responsive to audio signals. Distance cues may be provided by the amount of correlation between the direct sound and the indirect sound or by the ratio of direct radiation and indirect radiation. A more detailed description of spatial cues can be found in U.S. patent application Ser. No. 10/309,395 incorporated herein by reference.

The directional loudspeakers relatively close to the head permit manipulation of spatial cues including ILD and ITD cues, radiated to the individual seating positions, and permit spatial effects to be different at different listening positions.

One phenomenon that humans frequently experience, especially when localizing simulated sound sources (that is, when directional cues are inserted into the radiated sound), is front/back confusion. Listeners typically can localize the angular displacement from an axis connecting a listener's ears, but may have difficulty distinguishing whether the apparent source is in the front or rear hemispheres. One method humans use, when listening to actual spatial sound sources ("live sound"), is to resolve front/back confusion is to rotate the head. If the head is rotated, the front/back confusion is resolved by detecting if the spatial cues are more consistent with a sound source in front or behind the listener.

In order to provide spatial cues to resolve front/back confusion, it may be helpful to place front loudspeakers 88 and 90 in the front of the listening positions. The spatial cues and most of the audibly communicated information can be radiated by the directional loudspeakers and the front loudspeakers are only required to resolve front/back confusion. For that reason, front loudspeakers 88 and 90 can be limited range speakers and can radiate sound at a relatively low volume and still be effective. Front loudspeakers 88 and 90 may be coupled to the seat specific audio signal processing circuitry 54, 56 respectively, or to the audio signal processing circuitry 52, or coupled to both. Front loudspeakers 88 and 90 may be used for purposes other than resolving front/back confusion; some examples will be described later.

Figure 5:
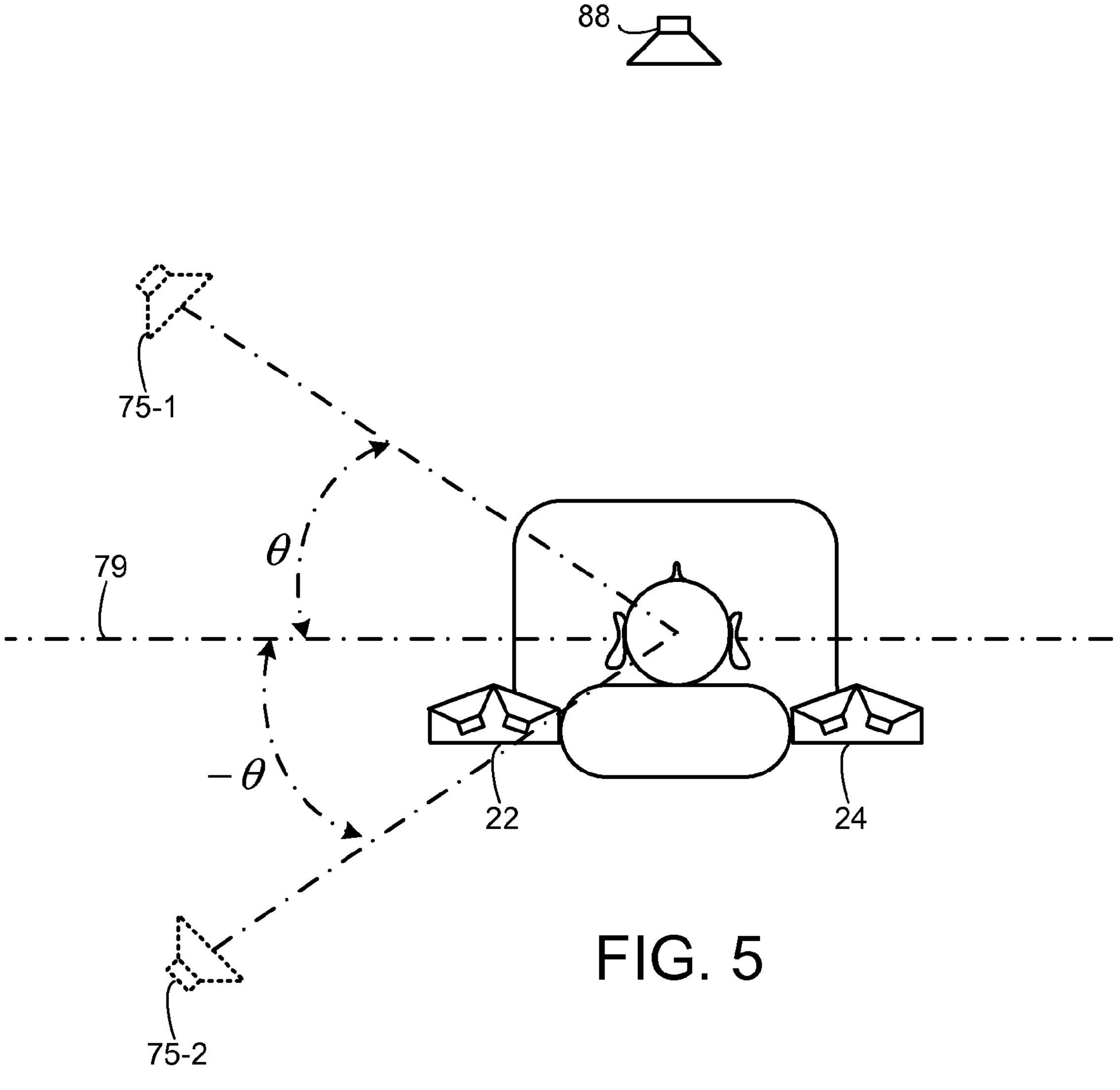
FIGS. 5, 6A-6B, 7A-7B, and 8A-8B are diagrams illustrating a seated listener and actual and perceived location of sound sources.

For example, in FIG. 5, if spatial cues are radiated by directional loudspeakers 22 and 24 and the same audio content is radiated by front loudspeaker 88, the sound may appear to originate at a point 75-1, displaced and angle θ from an axis 79 connecting the listener's ears, in front of the listener. If there is no radiation of the same audio content from front loudspeaker 88, the sound may appear to originate at a point 75-2, displaced from the axis 79 by an angle −θ, behind the listener.

Figure 6A:
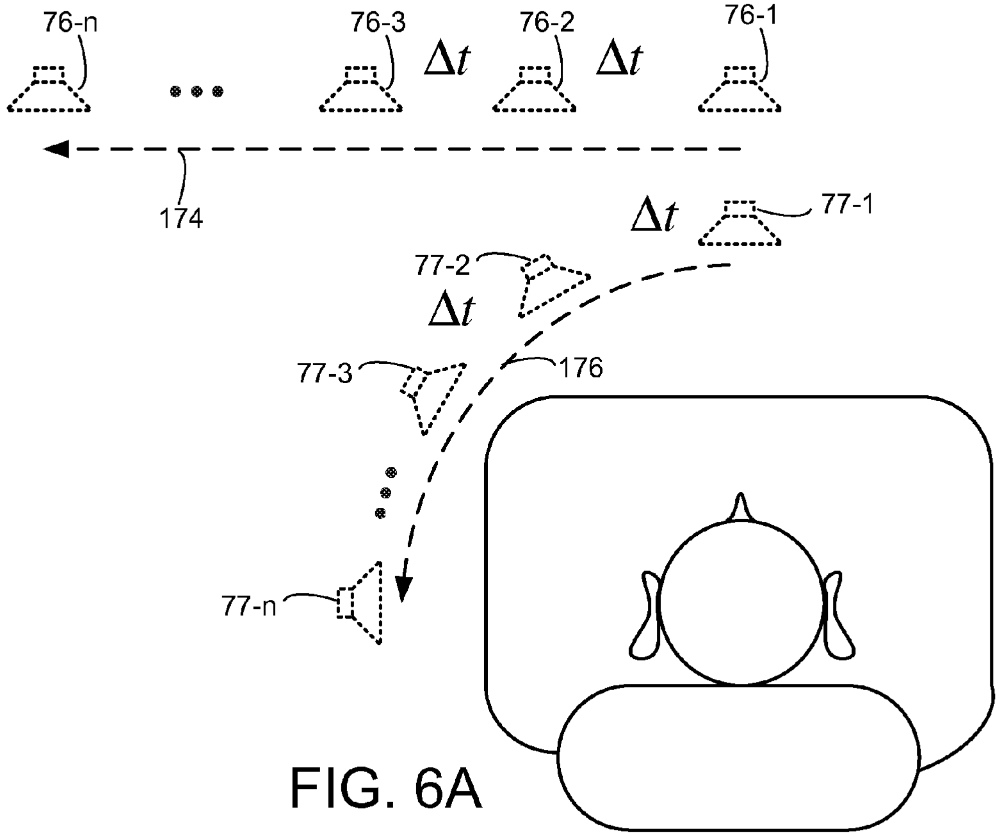

In addition to providing spatial cues that cause sound to appear to originate at a static point, the vehicle audio system of FIGS. 2-4 may cause sound to appear to originate from a moving source. As an example, voice cues from a navigation system and the vehicle system will be considered. For example, referring to FIG. 6A, the first spatial cues can cause the sound to appear to originate at phantom loudspeaker 76-1. After a time interval Δt, for example five milliseconds, the spatial cues cause sound to appear to originate at point to the left (relative to the listener) indicated by phantom loudspeaker 76-2. After a second time interval Δt, the spatial cues cause sound to appear to originate at point to the left as indicated by phantom loudspeaker 76-3, and so forth until after n−1 intervals, the spatial cues cause sound to appear to originate at a point to the left of the other apparent origination points, indicated by phantom loudspeaker **76-*n*. Perceptually, this causes the source of the sound to appear to move to the left as indicated by line 174. If the ILD and ITD cues are changed, but the distance cues remain constant, the source of the sound may appear to move along an arcuate path, centered on the listener, as indicated by line 176 and by phantom loudspeakers 77-1-77-*n***. If the sound being radiated is the message "turn to the left" the apparent movement of the source of the sound reinforces the instruction to turn to the left.

Figure 6B:
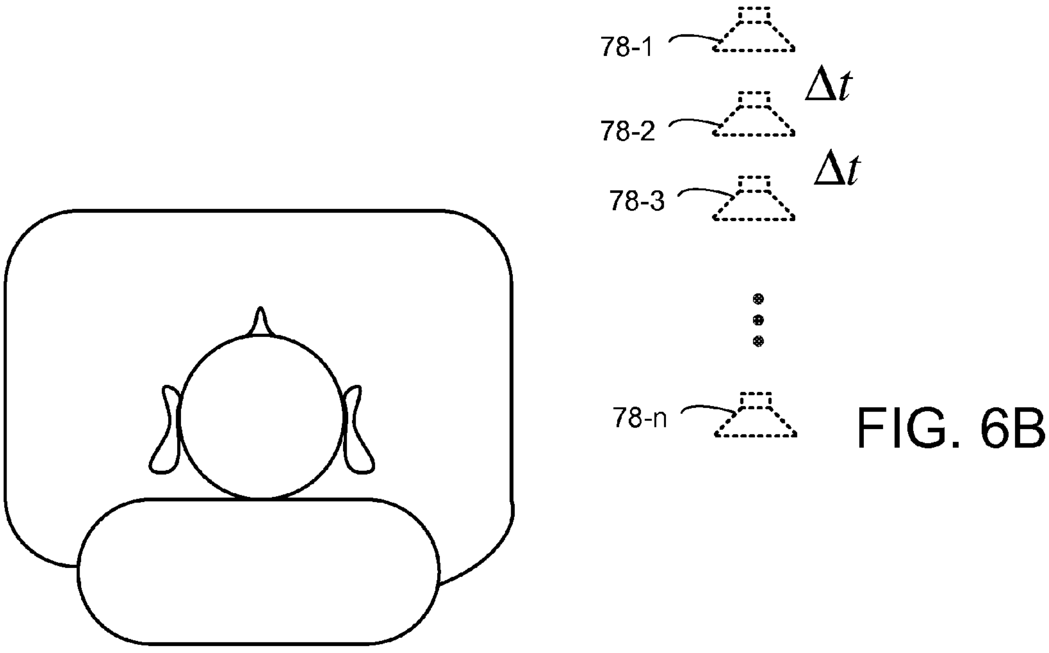

In FIG. 6B, spatial cues cause sound to appear to originate at a point in front of and to the right of the listener indicated by a phantom loudspeaker 78-1. After a time interval Δt, for example five milliseconds, the spatial cues cause sound to appear to originate at a point to the right of, in front of, and closer to the listener, indicated by a phantom loudspeaker 78-2. After a second time interval Δt, the spatial cues cause sound to appear to originate to the right of, in front of, and still closer to the listener, indicated by a phantom loudspeaker 78-3, and so forth until after n−1 intervals the spatial cues cause sound to appear to originate to the right of and approximately even with the listener, indicated by phantom loudspeaker **78-*n***. Perceptually, this causes the source of the sound to appear to move from the right front of the listener to the right of the listener, or since motion is relative, this causes it to appear that the vehicle is approaching a stationary source of the sound on the right. If, for example, the sound being radiated is "you are approaching Elm Street on your right" the relative motion between the apparent sound source and the listener reinforces the information being communicated to the listener.

Figure 7A:
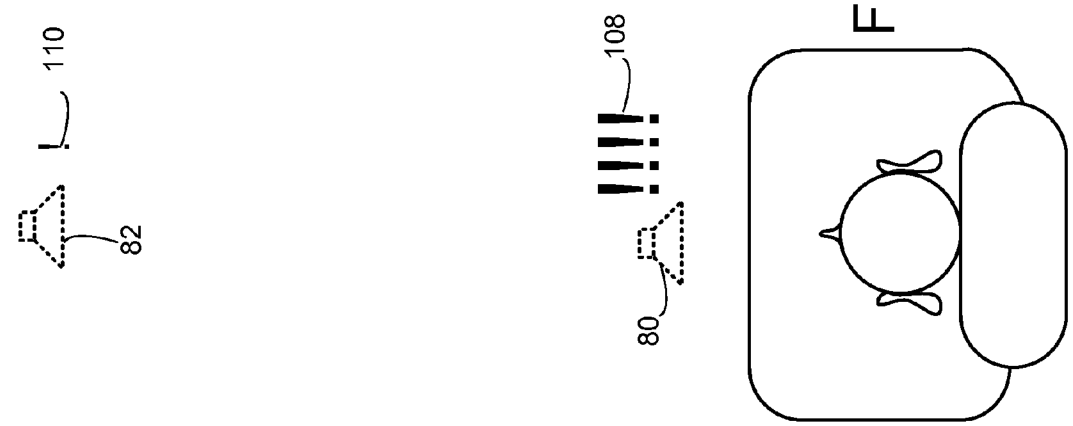
Figure 7B:
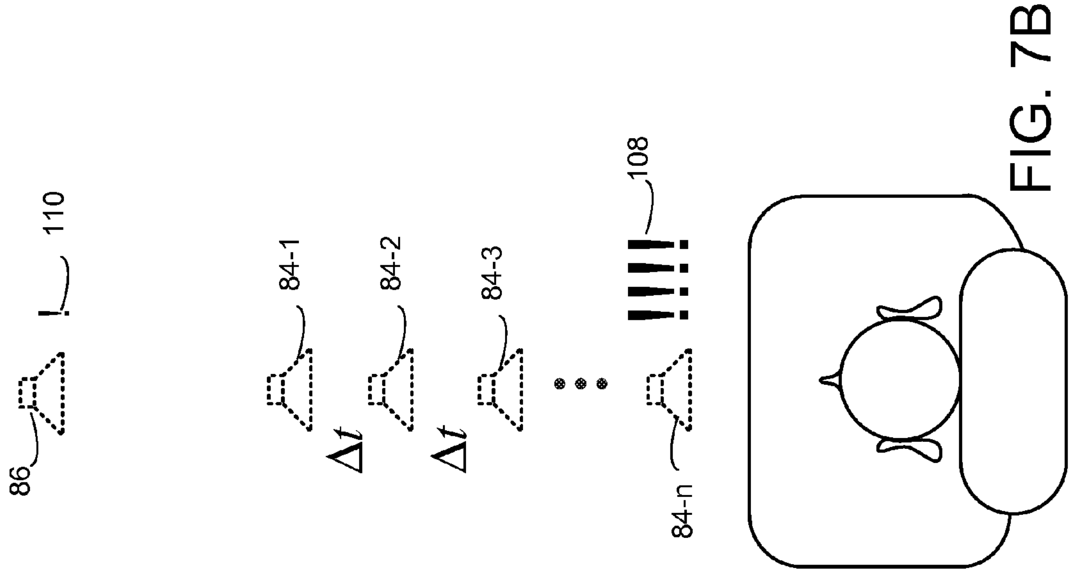

Spatial cues can also be used to emphasize important information. For example the importance of the contents of a message can be emphasized by the perceived distance from the listener. In FIG. 7A, spatial cues cause important (indicated by multiple large exclamation points 108) audibly communicated messages such as warnings to appear to come from a source close to the listener, as indicated by near phantom loudspeaker 80. Spatial cues cause less important (indicated by a single small exclamation point 110) audibly communicated information, for example an indication that the vehicle should be given routine maintenance, to appear to come from a source far from the listener, as indicated by far phantom loudspeaker 82. As shown in FIG. 7B, spatial cues can cause important audibly communicated messages such as warnings to appear to come from a moving source, as indicated by phantom loudspeakers **84-1-84-*n*. The importance of the message can be emphasized by the perceived speed of the moving source. More important messages can appear to originate from a faster moving source, by increasing the distance that the acoustic image moves in each time period, or from a source that moves an accelerating or decelerating rate, by varying the distance that the acoustic image moves each time period. Spatial cues cause less important audibly communicated information to appear to come from a stationary source 86**.

Figure 8A:
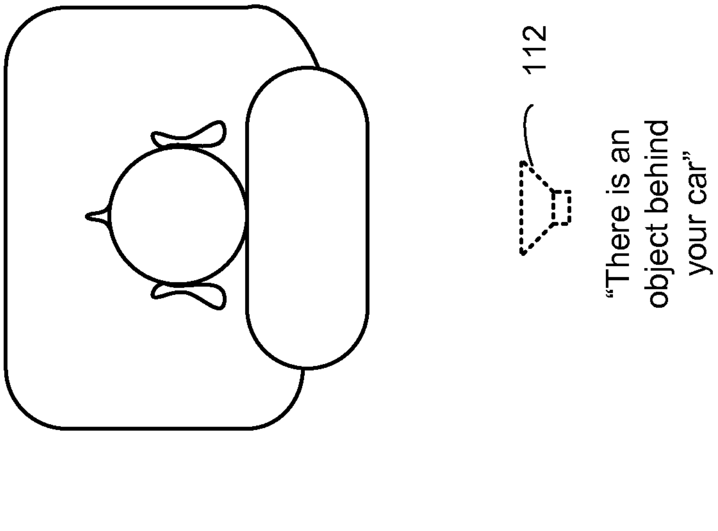
Figure 8B:
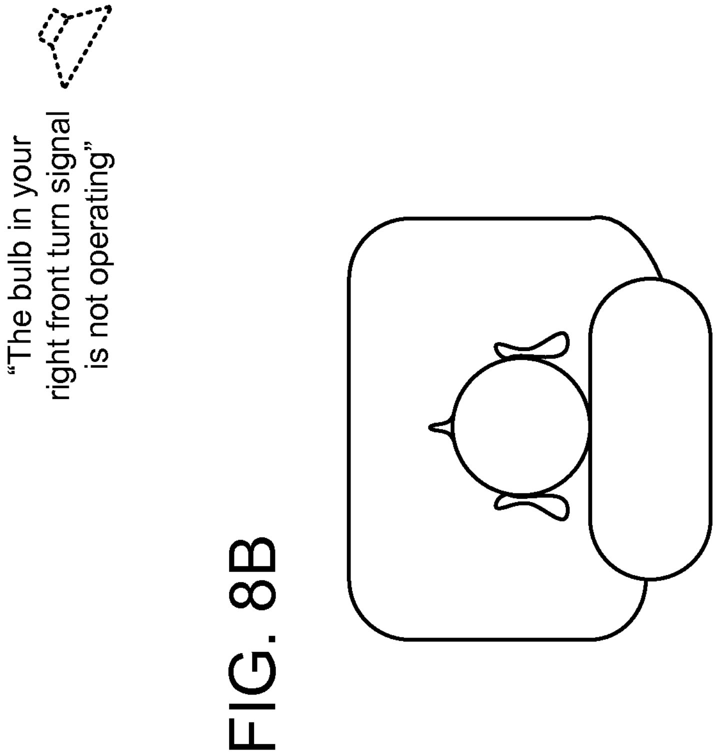

Spatial cues can also cause an audible message that refers to a part of the vehicle or a direction relative to the vehicle to appear to originate from the part of the vehicle or from the direction relative to the vehicle. For example, as shown in FIG. 8A, if a sensor detects an object behind the car, a warning could appear to originate from a point behind the car as indicated by phantom loudspeaker 112. In FIG. 8B, if a light is not operating, an audible message could appear to originate at the light as indicated by phantom loudspeaker 114.

Figure 9A:
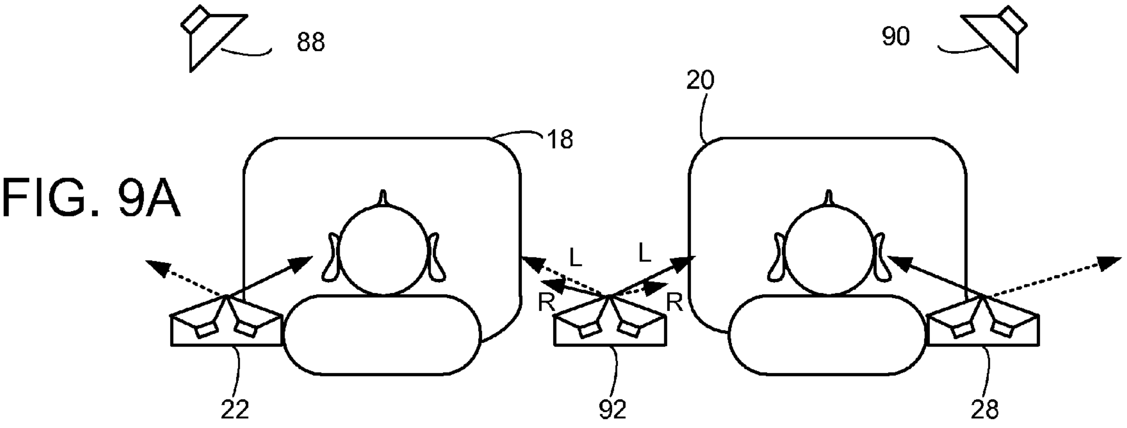
FIGS. 9A-9C are diagrams of two seated listeners and loudspeakers.
Figure 9B:
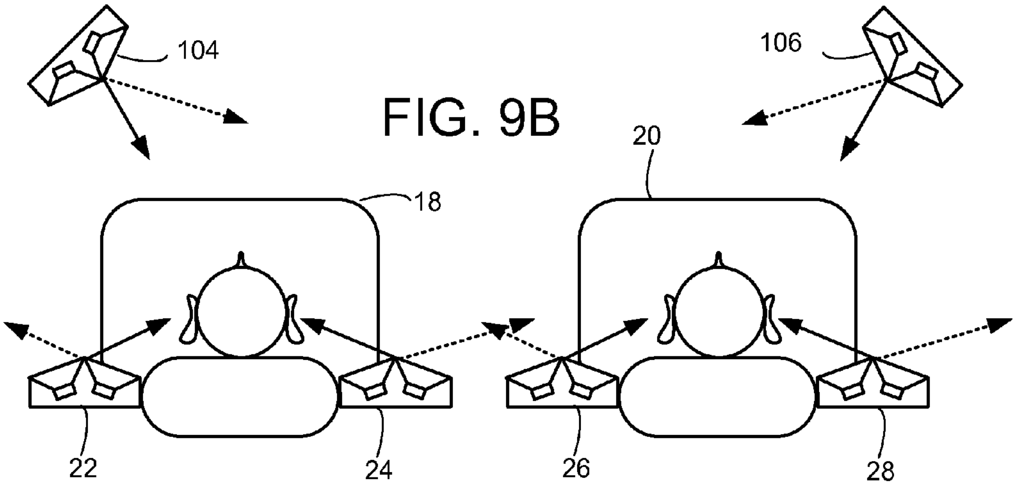
Figure 9C:
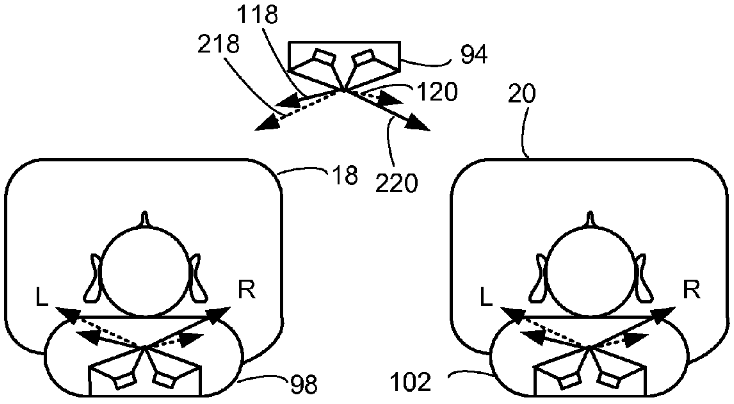

FIGS. 9A-9C show alternate configurations of the loudspeakers of FIG. 4. In FIG. 9A, the front loudspeakers 88 and 90 are positioned at a laterally displaced position, for example in a vehicle A-pillar; it is not necessary for the front loudspeakers to be directly in front of the listening position so long as they are in the front hemisphere. In addition, directional loudspeakers 24 and 26 of FIG. 4 are replaced by a single directional array 92. The single array radiates audio content intended for the listeners in both positions 18 and 20. The single array radiates sound intended for the right ear (denoted as "R") of the listener in position 18 so that the direction toward listening position 18 is a high radiation direction and so that the direction toward listening position 20 is a low radiation direction. The single array radiates sound intended for the left ear (denoted as "L") of the listener in position 20 so that the direction toward listening position 20 is a high radiation direction and so that the direction toward listening position 20 is a low radiation direction.

In FIG. 9B, front arrays 88 and 90 of FIG. 9A are replaced by front directional arrays 104 and 106. Front array 88 radiates sound so that the direction toward the listener in seating position 18 is a high radiation direction and so that the direction toward seating position 20 is a low radiation direction. The position of the front loudspeaker s 88 and 90 can be varied independently of whether single array 92 or two arrays 24 and 26 are used between the listeners in seating position 18 and 20.

In FIG. 9C, front loudspeakers 88 and 90 of FIG. 9A are replaced by a front array 94 which radiates sound intended for both seating positions 18 and 20. Sound intended for seating position 18 is radiated so that direction 118 toward seating position 18 is a high radiation direction and so that direction 120 toward seating position 20 is a low radiation direction. For clarity, directions 118 and 218 have been shown as slightly different. In an actual implementation, directions 118 and 218 may be the same direction. Sound intended for seating position 20 is radiated so that direction 220 toward seating position 20 is a high radiation direction and so that direction 218 toward seating position 20 is a low radiation position. Arrays 22 and 24 of FIG. 4 are replaced by single array 98, which radiates sound intended for the left ear (designated "L") of the listener so that the direction toward the left ear of the listener is a high radiation direction and so that the direction toward the right ear of the listener is a low radiation direction. Sound intended for the right ear (designated "R") of the listener is radiated so that the direction toward the right ear of the listener is a high radiation direction and so that the direction toward the left ear of the listener is a low radiation direction. Arrays 26 and 28 of FIG. 4 are replaced by a single array 102, which radiates sound in a manner similar to array 98. Replacement of loudspeakers 88 and 90 by a single array 94 is independent of whether arrays 22 and 24 are replaced by a single array 98 and whether arrays 26 and 28 are replaced by a single array 102.

Figure 10:
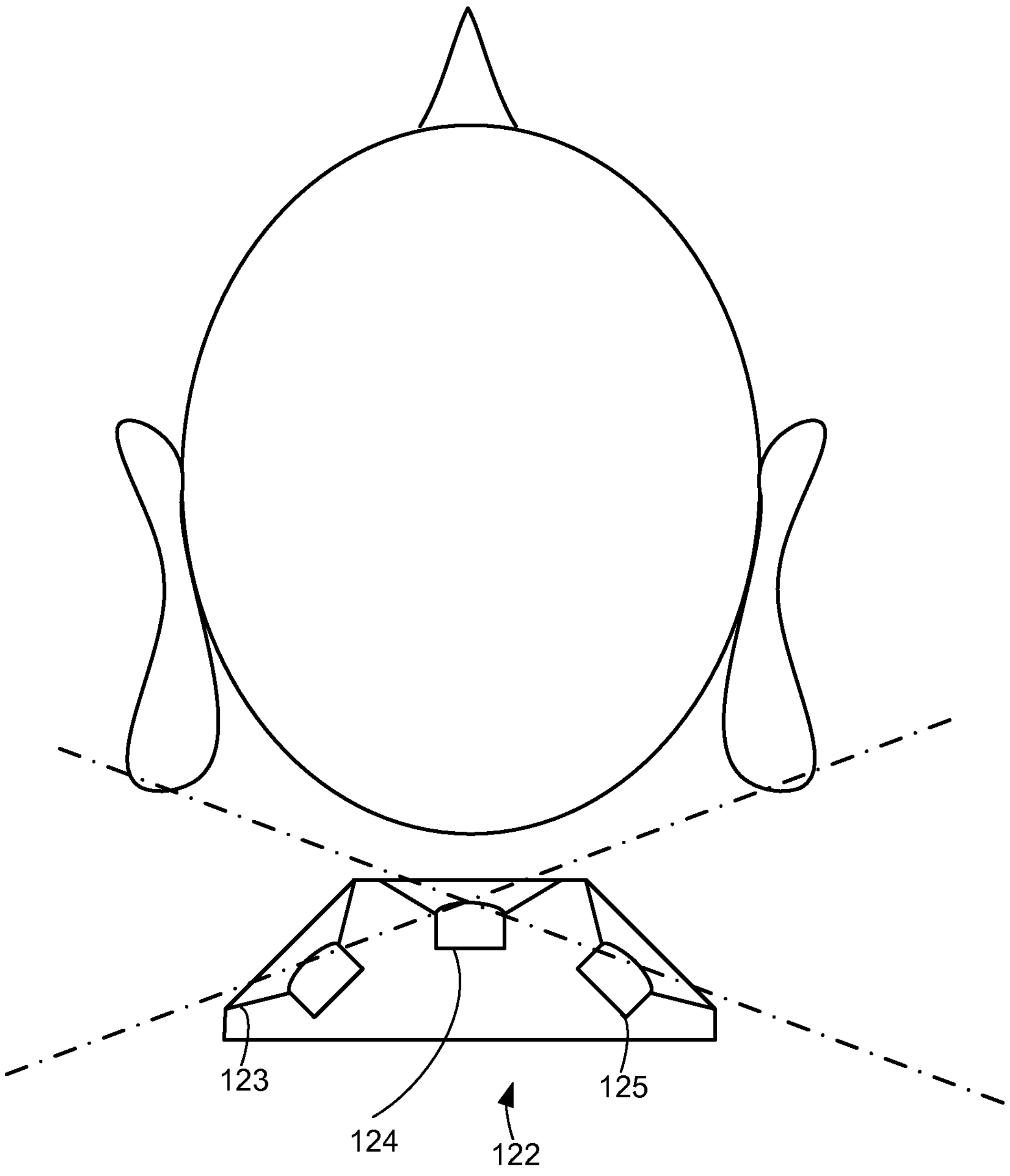
FIG. 10 is a diagram of a three element directional loudspeaker and the head of a listener.

FIG. 10 shows a specific implementation of a three element directional array 122 suitable for the arrangement of FIG. 9C. The arrangement of FIG. 10 includes three acoustic drivers 123, 124, and 125 mounted so that center acoustic driver 124 is forward of left and right acoustic drivers 123 and 125 respectively, and ideally as close to collinear with the ear (that is, so some common point, such as the centers of the dustcaps of acoustic drivers 123 and 124 and of acoustic drivers 124 and 125 are collinear with the entrance of an ear canal of the user) as space and packaging requirements permit. Generally, the greatest degree of directionality can be attained at points along a line connecting the two acoustic drivers. Acoustic drivers 123 and 125 are oriented so that their axes 223 and 225 are oriented in the direction of the user's ears. In one implementation, the angle is 45 degrees.

Figure 11A:
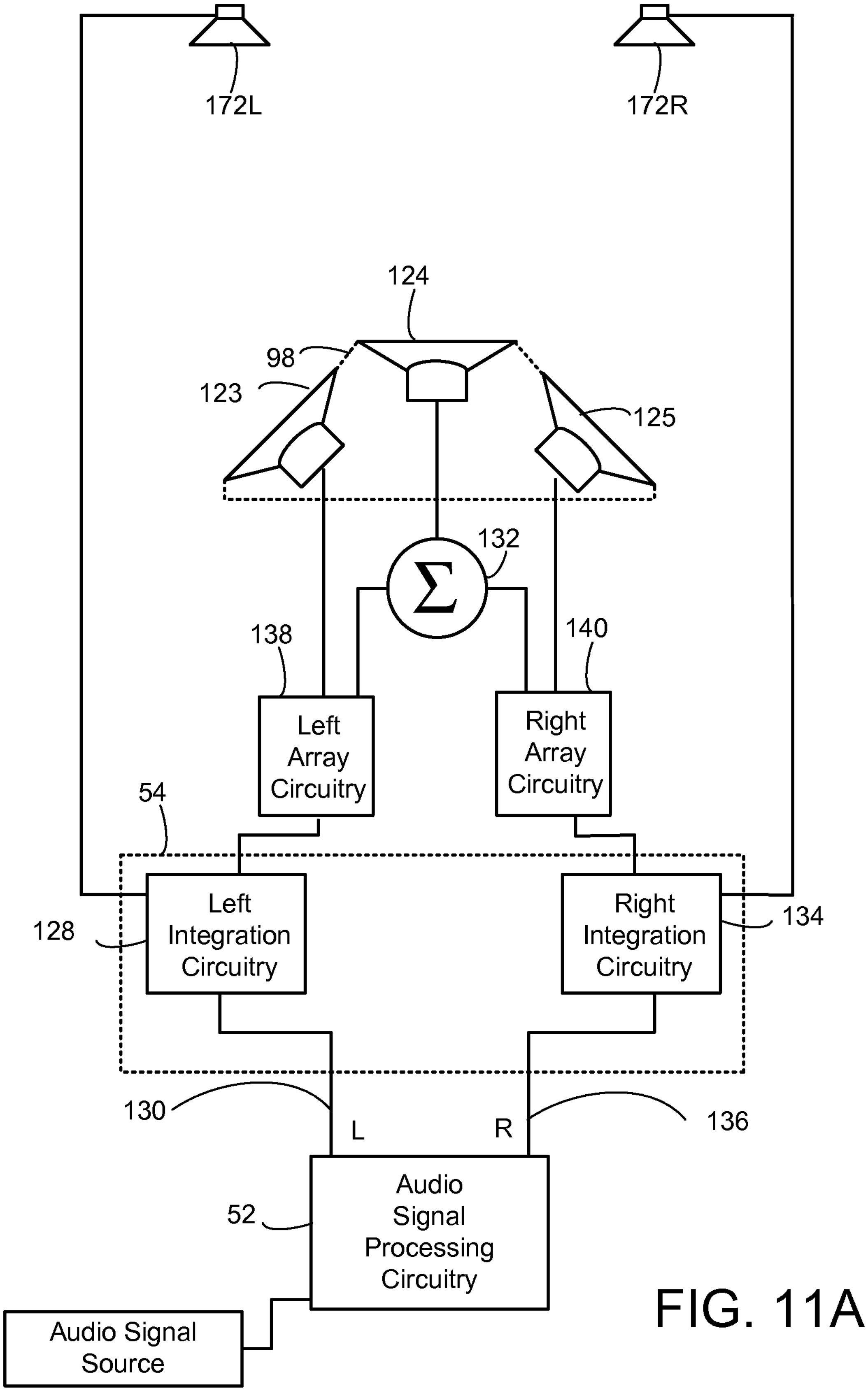
FIGS. 11A-11C are block diagrams.

FIG. 11A shows some elements of one embodiment of seat specific audio processing circuitry 54 for use with one directional loudspeaker. Seat specific audio processing circuitry 54 may also have some or all of the elements shown in FIG. 4, but for simplicity, those elements are not shown in this view. Seat specific audio processing circuitry 54 includes a left integration circuitry 128 coupled to a left channel terminal by signal line 130 and to signal combiner 132 and to left acoustic driver 123 through left array circuitry 138. Signal combiner 132 is coupled to center acoustic driver 124. Right integration circuitry 134 is coupled to a right signal terminal by signal line 136 and to right acoustic driver 125 and to signal combiner 132 through right array circuitry 140. Left integration circuitry 128 may also be coupled to one or more speakers, represented by speaker 172L, located about the vehicle cabin, such as in the instrument panel, in a door, or in a pillar. Right integration circuitry 134 may also be coupled to one or more speakers, represented by speaker 172R, located about the vehicle cabin, such as in the instrument panel, in a door, or in a pillar Seat specific audio processing circuitry 56 has similar components.

In operation, the left integration circuitry 128 applies a transfer function $H_{128}(s)$ to the left channel signal. The operation of transfer function $H_{128}(s)$ will be described later. Left array circuitry 138 applies transfer function $H_{138}(s)$ to the output signal from left integration circuitry 128. Transfer function $H_{138}(s)$ includes some combination of phase shift, polarity inversion, delay, attenuation and other signal processing in a manner described in U.S. Pat. No. 5,870,484 or U.S. Pat. No. 5,809,153 to provide audio signals that result in the desired left channel radiation pattern such as is shown in FIG. 8C. Similarly, right array circuitry 140 applies a transfer function $H_{140}(s)$ to the right channel input signal to provide audio signals that result in the desired right channel radiation pattern such as is shown in FIG. 9C. The output signal from the left array circuitry and the right array circuitry are combined at signal combiner 132 and transmitted to center acoustic driver 124. Left acoustic driver 123 radiates the left channel, right acoustic driver 125 radiates the right channel and center acoustic driver 124 radiates sound waves that destructively combine with the sound waves radiated from left speaker 123 and right speaker 125 to provide a desired radiation pattern, such as is shown in FIG. 9C. In FIG. 11A and in all other figures, an element providing an output signal to more than one device (for example, left array circuitry 138 provides an output signal to signal combiner 132 and to left acoustic driver 123) does not necessarily mean that the element provides the same signal to both devices.

Figure 11B:
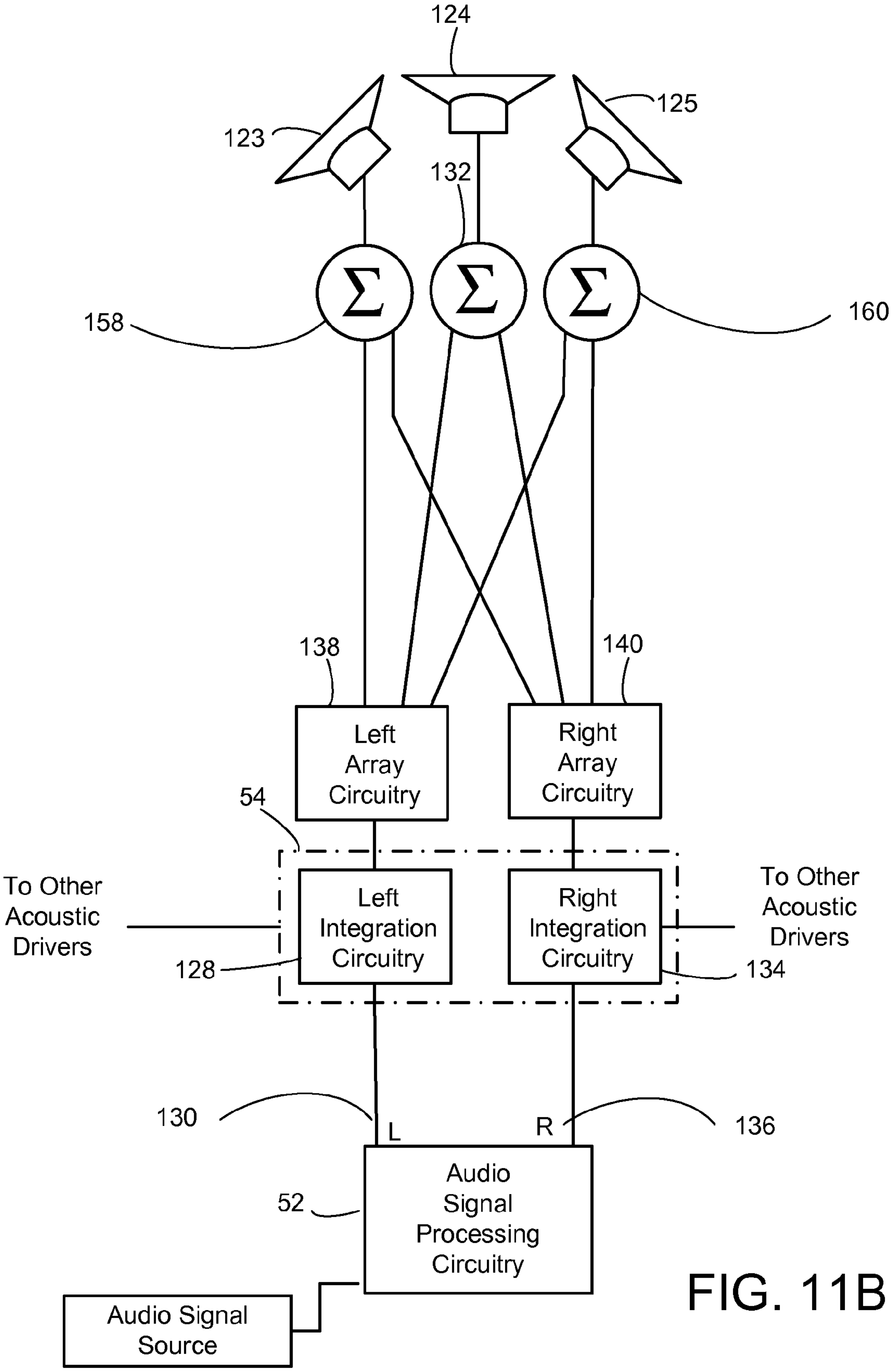

FIG. 11B shows some elements of an alternate implementation of the embodiment of FIG. 11A. Seat specific audio processing circuitry 54 may also have some or all of the elements shown in FIG. 4, but for simplicity, those elements are not shown in this view. The implementation of FIG. 11B includes the elements of FIG. 11A and in addition includes a signal combiner 158 coupling right array circuitry 140 with left acoustic driver 123. Signal combiner 160 couples left array circuitry 138 with right acoustic driver 125. Seat specific audio processing circuitry 54 may include, for example, the seat specific equalizer 64, seat specific dynamic volume control circuitry 66, seat specific volume control circuitry 68, and seat specific other functions circuitry 67, and/or seat specific spatial cues processor 69, but they are not shown in this view.

The implementation of FIG. 11B operates in a manner similar to the implementation of FIG. 11A except that both left acoustic driver 123 and center acoustic driver 124 radiate sound waves that destructively combine with the sound waves radiated from right acoustic driver 10C and both right acoustic driver 125 and center acoustic driver 124 radiate sound waves that destructively interfere with sound waves radiated from left acoustic driver 123. The signal transmitted from right array circuitry 140 to left acoustic driver 123 is typically different from the signal transmitted from right array circuitry 140 to center acoustic driver 124 because of differences in spacing between acoustic driver 123 and acoustic driver 125. Similarly, the signal transmitted from left array circuitry 138 to right acoustic driver 125 is typically different from the signal transmitted from left array circuitry 138 to center acoustic driver 124

Figure 11C:
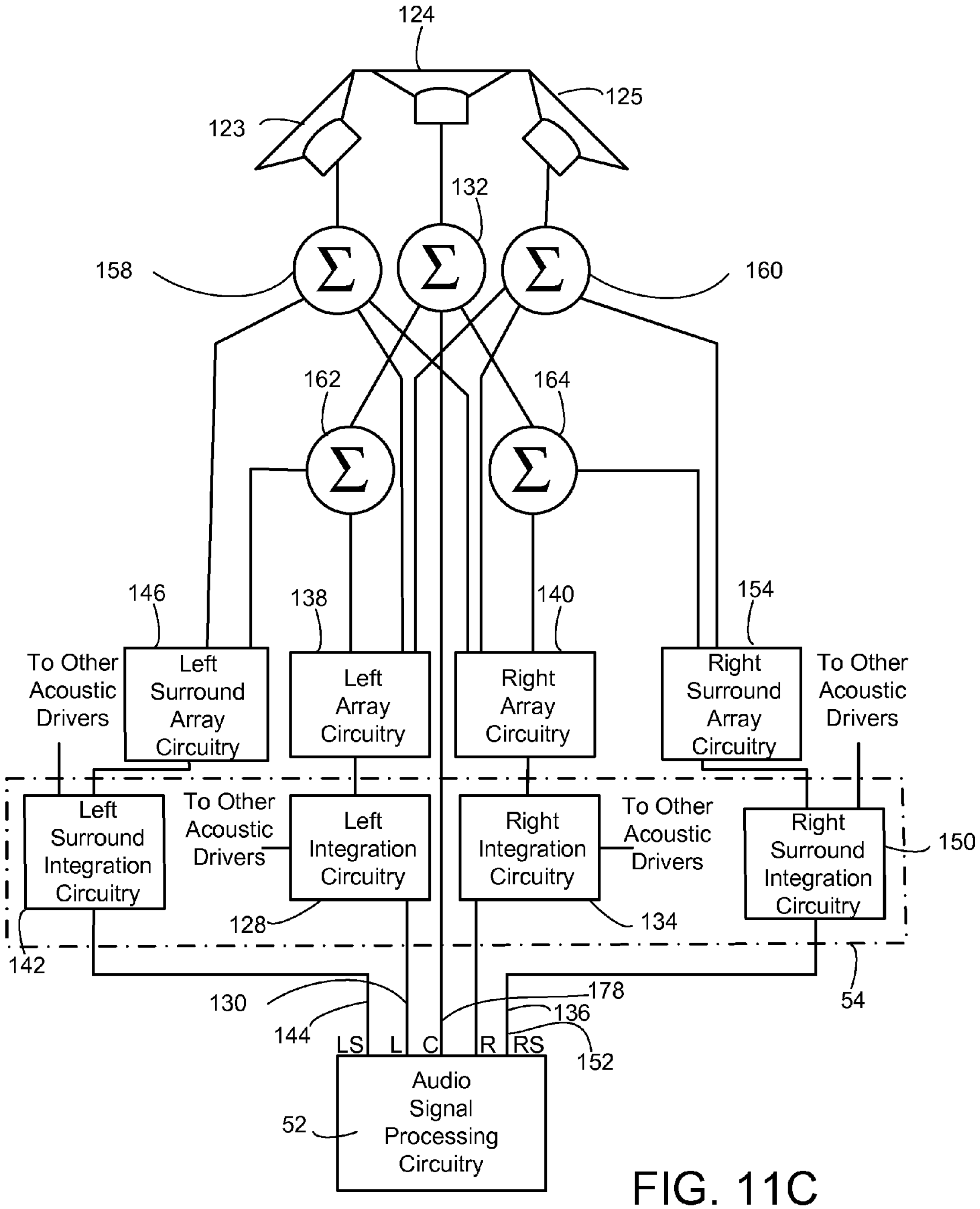

FIG. 11C shows some elements of another embodiment of seat specific audio processing circuitry 54. Seat specific audio processing circuitry 54 may also have some or all of the elements shown in FIG. 4, but for simplicity, those elements are not shown in this view. Seat specific audio processing circuitry 54 includes the elements of the implementation of FIG. 11A and in addition includes a left surround integration circuitry 142 coupled to a left surround channel terminal by signal line 144 and to left surround array circuitry 146, which is coupled to left signal combiner 158 and left array combiner 162. A right surround integration circuitry 150 is coupled to a right surround channel terminal by signal line 152 and to right surround array circuitry 154 which is coupled to right signal combiner 160 and right array combiner 164. Left integration circuitry 128 is coupled to left array circuitry 138. Right integration circuitry 134 is coupled to right array circuitry 140. Left array circuitry 138 is coupled to left array combiner 162, to left signal combiner 158 and may optionally be coupled to signal combiner 160. Right array circuitry 140 is coupled to right array combiner 164 and to right signal combiner 160 and may optionally be coupled to signal combiner 158. Signal combiner 158 is coupled to acoustic driver 123. Signal combiner 132 is coupled to center acoustic driver 124. Signal combiner 160 is coupled to acoustic driver 125. Left array combiner 162, right array combiner 164, and a center channel terminal by signal line 178 are coupled to combiner 132. Seat specific audio processing circuitry 54 may also include, for example, the seat specific equalizer 64, seat specific dynamic volume control circuitry 66, seat specific volume control circuitry 68, seat specific other functions circuitry 67, and/or seat specific spatial cues processor 69, but they are not shown in this view. Additionally, either or both of left array circuitry 138 and left surround array circuitry 146 may be coupled to signal combiner 160, and either or both of right array circuitry 140 and right surround array circuitry 154 may be coupled to signal combiner 158; none of these connections are shown in this view.

The implementation of FIG. 11C operates in a manner similar to the implementation of FIG. 11A. In addition, left surround array circuitry 146 applies transfer function $H_{146}(s)$ to the output signal from left surround integration circuitry 142. Transfer function $H_{146}(s)$ modifies the audio signal to provide the desired left surround channel radiation pattern such as is shown in FIG. 9C. Similarly, right surround array circuitry 154 applies a transfer function $H_{154}(s)$ to the right surround channel input signal to provide audio signals that result in the desired right surround channel radiation pattern such as is shown in FIG. 9C. Output signals from the left array circuitry 138 and the left surround array circuitry 146 are combined at left array combiner 162. Output signals from the right array circuitry 140 and the right surround array circuitry 154 are combined at combiner 164. The left speaker 123 radiates the left and left surround channels. The center speaker 124 and optionally the right speaker 125 radiate sound waves that destructively combine with the sound waves radiated by the left speaker to create a desired directional radiation pattern.

In one implementation, the parameters of transfer function $H_{138}(s)$ are set according to the techniques described in U.S. Pat. No. 5,870,484 and U.S. Pat. No. 5,809,153 to result in an anechoic radiation pattern shown in FIG. 12A. The parameters of transfer function $H_{146}(s)$ are set to result in the anechoic radiation pattern of FIG. 12B. This results in the left channel radiation and the left surround radiation appearing to have different spatial characteristics and therefore achieve a desire spatial effect. Similarly the parameters of transfer functions $H_{140}(s)$ and $H_{154}(s)$ can be set to have the minor image radiation patterns of transfer functions $H_{138}(s)$ and $H_{146}(s)$, respectively, resulting an a similar spatial effect for the right and right surround channels.

Referring again to FIG. 11A, the integration circuitry 128 applies a transfer function $H_{128}(s)$ to the left channel signal. Transfer function $H_{128}(s)$ modifies the audio signal transmitted to speaker 172L and to the directional loudspeaker 98 to achieve some desired effect. For example, the vehicle audio system may be used to radiate stereo signals, in which the sound is not intended to appear to originate behind the listener and which do not include spatial cues, so that the spatial cues are provided primarily by the amplitude, time, and phase relationships of the speakers. In this instance, the transfer function $H_{128}(s)$ may low pass filter the signal to the directional loudspeaker 98 with a break frequency of 2 kHz. At frequencies above 2 kHz, ILD dominates spatial perception, and sound waves of above 2 kHz radiated by the array speakers may undesirably dominate spatial perception because they are located very close to the head, and therefore the ILD cues vary widely with head rotation and movement. Additionally, speakers designed to fit in vehicle headrests may be relatively small and not suited for radiating bass frequencies. Transfer function $H_{128}(s)$ may also high pass filter the audio signal to directional loudspeaker 98 with a filter with a break point at, for example, 250 Hz so that bass spectral components are not radiated by the array speakers. Additionally, transfer function $H_{128}(s)$ may apply a delay, amplification, or attenuation to the signals transmitted to the array and to the vehicle speaker 172L so that the sound radiated by the headrest have a greater amplitude and arrive first, and therefore dominate spatial perception. In some circumstances it may be desirable for the sound from speakers 172L and 172R to dominate spatial perception. In those cases, transfer function $H_{128}(s)$ may apply a delay or attenuation, or both, to the audio signal transmitted to the headrest speaker 98. Integration circuitry 128 and 134 of FIG. 11B and integration circuitry 128, 134, 142, and 150 of FIG. 11C function in a similar manner.

The specific implementations of FIGS. 2, 3, 4, 9A-C, and 11A-11C are exemplary and not exhaustive. The elements of FIGS. 2, 3, 4, 9A-C, and 11A-11C can be combined in many other permutations and combinations to achieve desired results.

Other embodiments are in the claims.

What is claimed is:

1. An audio system for a vehicle, comprising:

a directional loudspeaker mounted to a vehicle seat, behind an intended location of the head of an occupant of the vehicle seat and substantially equidistant from an intended position of the two ears of the occupant of the vehicle seat;

the directional loudspeaker for radiating a first non-surround channel audio signal directionally so that the direction toward an intended location of a first ear position of the occupant of the vehicle seat is a high radiation direction and for radiating a second non-surround channel audio signal directionally so that the direction toward an intended location of a second ear position of the occupant of the vehicle seat is a high radiation direction;

a forward mounted loudspeaker mounted forward of the directional loudspeaker for radiating at least one of the first non-surround channel audio signal and the second non-surround channel audio signal;

signal processing circuitry for modifying the first non-surround channel audio signal to at least one of the directional loudspeaker and the forward mounted loudspeaker to cause one of the directional loudspeaker or the forward mounted speaker to dominate spatial perception, wherein the signal processing circuitry includes circuitry for delaying the first non-surround channel audio signal to one of the directional loudspeaker and the forward mounted loudspeaker.

2. An audio system according to claim 1, wherein the signal processing circuitry includes circuitry that modifies the first non-surround channel audio signal so that the forward mounted loudspeaker dominates spatial perception.

3. An audio system according to claim 1, wherein the forward mounted loudspeaker is for radiating a combination of the first non-surround channel audio signal and the second non-surround channel audio signal.

4. An audio system according to claim 1, wherein the signal processing circuitry comprises circuitry for attenuating the first non-surround channel audio signal to one of the directional loudspeaker and the forward mounted loudspeaker.

5. An audio system according to claim 1, wherein the signal processing circuitry includes circuitry that modifies the first non-surround channel audio signal so that the directional loudspeaker dominates spatial perception.

6. An audio system for a vehicle, comprising:

a directional loudspeaker mounted to a vehicle seat, behind an intended location of the head of an occupant of the vehicle seat and substantially equidistant from an intended position of the two ears of the occupant of the vehicle seat;

the directional loudspeaker for radiating a first non-surround channel audio signal directionally so that the direction toward an intended location of a first ear position of the occupant of the vehicle seat is a high radiation direction and for radiating a second non surround channel audio signal directionally so that the direction toward an intended location of a second ear position of the occupant of the vehicle seat is a high radiation direction;

a forward mounted loudspeaker mounted forward of the directional loudspeaker for radiating at least one of the first non-surround channel audio signal and the second non surround channel audio signal;

signal processing circuitry for modifying the first non-surround channel audio signal to at least one of the directional loudspeaker and the forward mounted loudspeaker to cause the directional loudspeaker to dominate spatial perception.

7. A method for operating a vehicle audio system, comprising:

directionally radiating, from a loudspeaker mounted to a vehicle seat, behind an intended location of the head of an occupant of the vehicle seat and substantially equidistant from an intended position of the two ears of the occupant of the vehicle seat, a first non-surround channel audio signal so that the direction toward an intended location of a first ear position of the occupant of the vehicle seat is a high radiation direction;

directionally radiating from the loudspeaker, a second non-surround channel audio signal so that the direction toward an intended location of a second ear position of the occupant of the vehicle seat is a high radiation direction;

non-directionally radiating, from a loudspeaker mounted forward of the directional loudspeaker, at least one of the first non-surround channel audio signal and the second non-surround channel audio signal;

and modifying the first non-surround channel audio signal to at least one of the directional loudspeaker and the forward mounted loudspeaker to cause one of the directional loudspeaker or the forward mounted speaker to dominate spatial perception, wherein the modifying comprises time delaying the first non-surround channel audio signal to one of the directional loudspeaker and the forward mounted loudspeaker.

8. A method system according to claim 7, wherein the modifying causes the forward mounted loudspeaker to dominate spatial perception.

9. An audio system according to claim 7, wherein the modifying comprises attenuating the first non-surround audio signal to one of the directional loudspeaker and the forward mounted loudspeaker.

10. A method according to claim 7, further comprising radiating a combination of the first non-surround channel audio signal and the second non-surround channel audio signal from a center channel forward mounted speaker.

11. A method according to claim 7, wherein the modifying causes the directional loudspeaker to dominate spatial perception.

12. A method for operating a vehicle audio system, comprising:

directionally radiating, from a loudspeaker mounted to a vehicle seat, behind an intended location of the head of an occupant of the vehicle seat and substantially equidistant from an intended position of the two ears of the occupant of the vehicle seat, a first non-surround channel audio signal so that the direction toward an intended location of a first ear position of the occupant of the vehicle seat is a high radiation direction;

directionally radiating from the loudspeaker, a second non-surround channel audio signal so that the direction toward an intended location of a second ear position of the occupant of the vehicle seat is a high radiation direction;

non-directionally radiating, from a loudspeaker mounted forward of the directional loudspeaker, at least one of the first non-surround channel audio signal and the second non-surround channel audio signal;

and modifying the first non-surround channel audio signal to at least one of the directional loudspeaker and the forward mounted loudspeaker to cause the directional loudspeaker to dominate spatial perception.

* * * * *